(12) United States Patent
Berg et al.

(10) Patent No.: US 8,229,824 B2
(45) Date of Patent: Jul. 24, 2012

(54) COMBINED ESTIMATE CONTEST AND PREDICTION MARKET

(75) Inventors: Henry G. Berg, Redmond, WA (US); Todd A. Proebsting, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 767 days.

(21) Appl. No.: 11/855,079

(22) Filed: Sep. 13, 2007

(65) Prior Publication Data

US 2009/0076974 A1 Mar. 19, 2009

(51) Int. Cl.
G06Q 40/00 (2006.01)

(52) U.S. Cl. .......................... 705/36 R; 705/37
(58) Field of Classification Search ........... 705/36 R–38
See application file for complete search history.

(56) References Cited

U.S. PATENT DOCUMENTS

| | | | |
|---|---|---|---|
| 5,452,410 A | 9/1995 | Magidson | |
| 6,012,044 A | 1/2000 | Maggioncalda et al. | |
| 6,195,647 B1 | 2/2001 | Martyn et al. | |
| 6,363,333 B1 | 3/2002 | Deco et al. | |
| 6,405,179 B1 | 6/2002 | Rebane | |
| 6,408,282 B1 | 6/2002 | Buist | |
| 6,418,417 B1 | 7/2002 | Corby et al. | |
| 6,443,841 B1 | 9/2002 | Rossides | |
| 6,473,084 B1 * | 10/2002 | Phillips et al. ................ | 345/440 |
| 6,606,615 B1 | 8/2003 | Jennings et al. | |
| 6,792,399 B1 | 9/2004 | Phillips et al. | |
| 6,831,663 B2 | 12/2004 | Chickering et al. | |
| 6,970,839 B2 | 11/2005 | Jakobsson | |
| 7,062,458 B2 | 6/2006 | Maggioncalda et al. | |
| 7,139,733 B2 | 11/2006 | Cao et al. | |
| 7,149,716 B2 | 12/2006 | Gatto | |
| 7,167,838 B1 | 1/2007 | Gatto | |
| 7,212,999 B2 | 5/2007 | Friesen et | |
| 7,233,922 B2 | 6/2007 | Asher et al. | |
| 7,236,953 B1 | 6/2007 | Cooper et al. | |
| 7,707,062 B2 | 4/2010 | Abramowicz | |
| 2001/0031656 A1 | 10/2001 | Marshall et al. | |
| 2002/0107784 A1 | 8/2002 | Hancock et al. | |
| 2002/0174052 A1 | 11/2002 | Guler et al. | |
| 2003/0041000 A1 | 2/2003 | Zajac et al. | |
| 2003/0096651 A1 | 5/2003 | Black | |
| 2003/0105703 A1 | 6/2003 | Palsky et al. | |
| 2003/0157976 A1 | 8/2003 | Simon et al. | |

(Continued)

OTHER PUBLICATIONS

Office Action dated May 6, 2010, U.S. Appl. No. 11/855,076, filed Sep. 13, 2007.

(Continued)

*Primary Examiner* — Thu Thao Havan
(74) *Attorney, Agent, or Firm* — Vierra Magen Marcus & DeNiro LLP

(57) ABSTRACT

Users participate in an estimate contest and a prediction market for forecasting an outcome of a future event. Data from the estimate contest and the prediction market can be combined to obtain accurate information about overall group beliefs and individual or sub-groups beliefs. In the estimate contest, users provide estimated probabilities of occurrence for different possible outcomes of the event. Trades can be proposed, or automatically executed, based on differences between the user's estimated probabilities and probabilities obtained from a prediction market in which the user can buy and sell securities which represent the different outcomes. For example, a buying opportunity may be present when the user's estimated probability exceeds the prediction market's probability. Further, the user can express a risk level which is factored into the proposed trades.

20 Claims, 20 Drawing Sheets

U.S. PATENT DOCUMENTS

| | | |
|---|---|---|
| 2004/0176994 A1 | 9/2004 | Fine et al. |
| 2005/0131790 A1 | 6/2005 | Benzschawel et al. |
| 2006/0106743 A1 | 5/2006 | Horvitz |
| 2006/0116920 A1 | 6/2006 | Shan |
| 2006/0155554 A1 | 7/2006 | Mo |
| 2006/0206365 A1 | 9/2006 | Boardman et al. |
| 2007/0043662 A1 | 2/2007 | Lancaster |
| 2007/0061219 A1 | 3/2007 | Palestrant et al. |
| 2007/0067211 A1 | 3/2007 | Kaplan et al. |
| 2007/0083458 A1 | 4/2007 | Rosenthal et al. |
| 2007/0288348 A1 | 12/2007 | Sireau |
| 2008/0058103 A1 | 3/2008 | Kovacic et al. |
| 2009/0054127 A1 | 2/2009 | Sweary et al. |
| 2009/0066028 A1 | 3/2009 | Kimble |
| 2009/0076939 A1 | 3/2009 | Berg et al. |

OTHER PUBLICATIONS

Restriction dated May 4, 2010, U.S. Appl. No. 11/855,085, filed Sep. 13, 2007.

Response to Restriction dated May 21, 2010, U.S. Appl. No. 11/855,085, filed Sep. 13, 2007.

Amendment dated Aug. 5, 2010, U.S. Appl. No. 11/855,076, filed Sep. 13, 2007.

Office Action dated Aug. 17, 2010, U.S. Appl. No. 11/855,085, filed Sep. 13, 2007.

Notice of Allowance dated Sep. 28, 2010, U.S. Appl. No. 11/855,076, filed Sep. 13, 2007.

Response to Non-Final Office Action dated Nov. 16, 2010, U.S. Appl. No. 11/855,085, filed Sep. 13, 2007.

Response to Office Action dated May 4, 2011, U.S. Appl. No. 11/855,085, filed Sep. 13, 2007.

Final Office Action dated Mar. 18, 2011, United States Patent & Trademark Office, U.S. Appl. No. 11/855,085, filed Sep. 13, 2007.

Non-Final Office Action dated Aug. 29, 2011, U.S. Appl. No. 11/855,085, filed Sep. 13, 2007.

Response to Office Action dated Nov 29, 2011, U.S. Appl. No. 11/855,085.

R. Hanson, "Combinatorial Information Market Design," Information Systems Frontiers 5(1):105-119, Jan. 2003.

M. Mathewson et al., "The interactive forecast preparation system," http://www-md.fsl.noaa.gov/eft/publications/fslForum2000/ifps.html, Dec. 2000.

T. Legg et al., "Predicting probabilities—the forecasts of the future," http://www.metoffice.gov.uk/research/nwp/publications/nwp_gazette/dec99/predict.html (Dec. 1999).

T. Gneiting, "Strictly Proper Scoring Rules, Prediction, and Estimation," http://www.stat.washington.edu/www/research/reports/2004/tr463.pdf (Sep. 2004).

S. Cherry, "Bet on It—Can a Stock Market of Ideas Help Companies Predict the Future?", IEEE Spectrum, Sep. 2007.

Manski, Charles F., "Interpreting The Predictions Of Prediction Markets," National Bureau of Economic Research, Mar. 2004, 14 pages.

\* cited by examiner

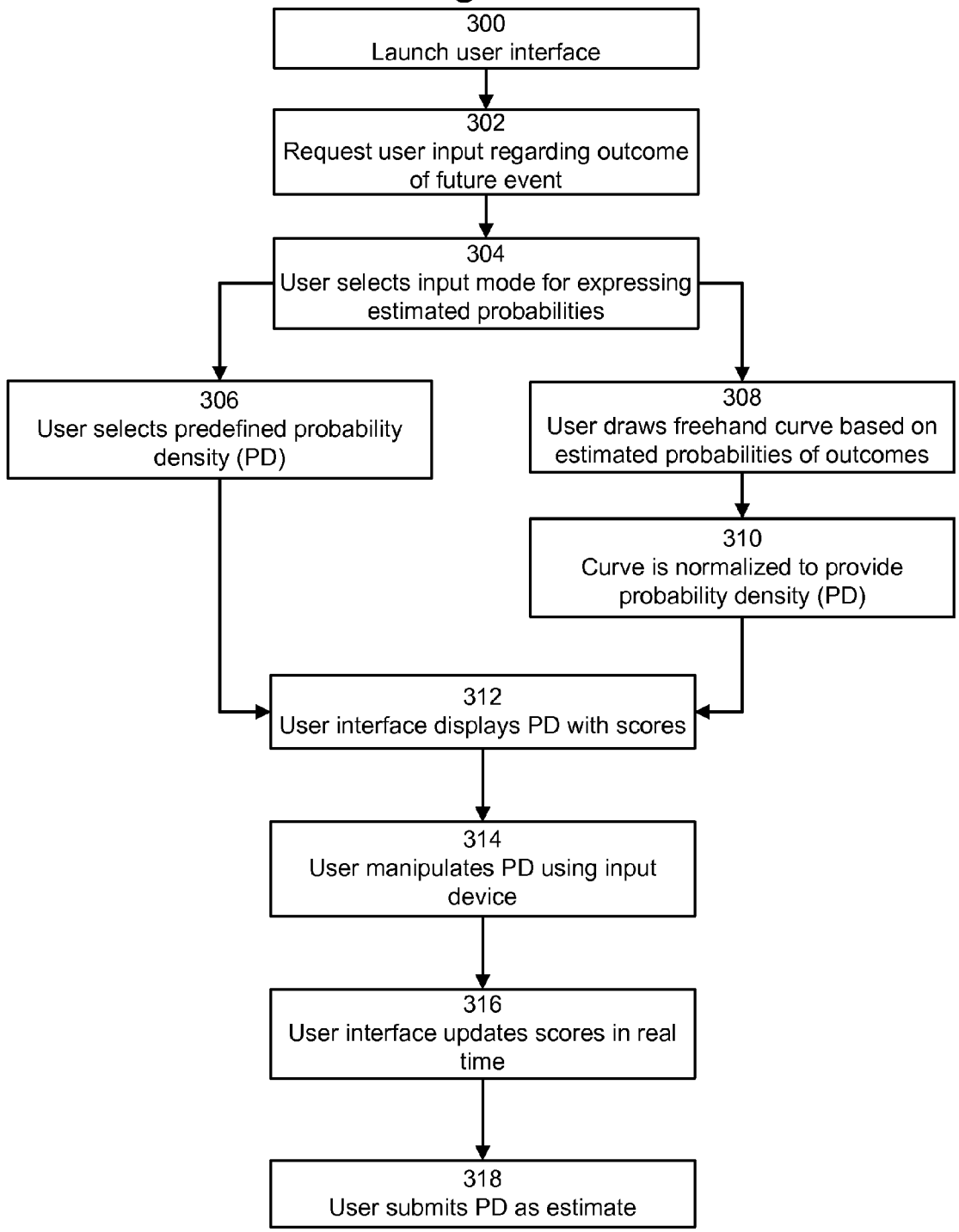

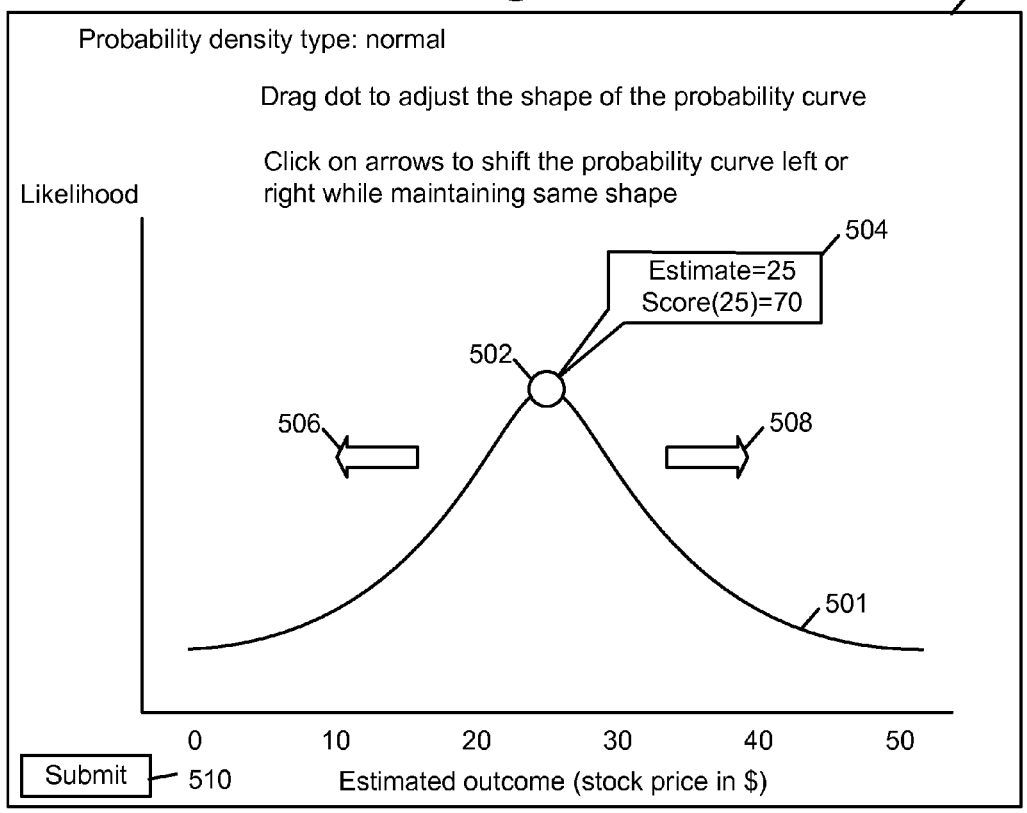

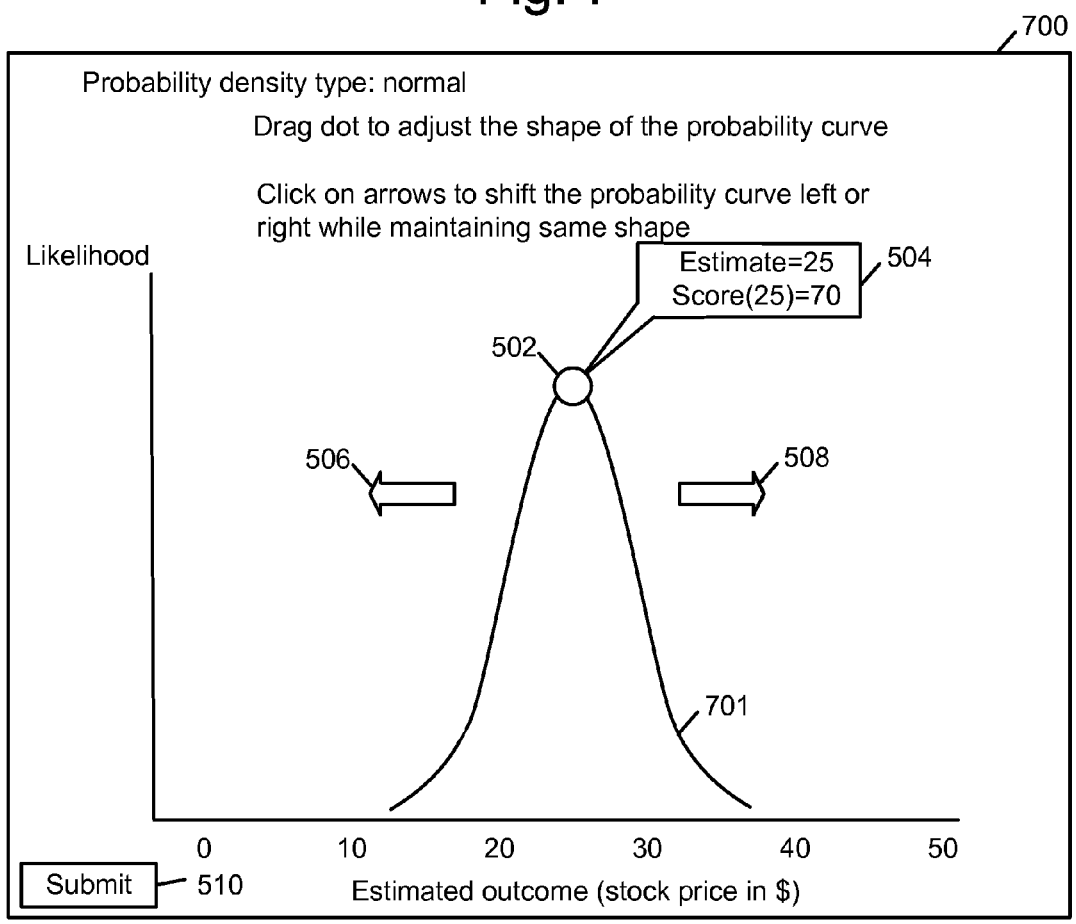

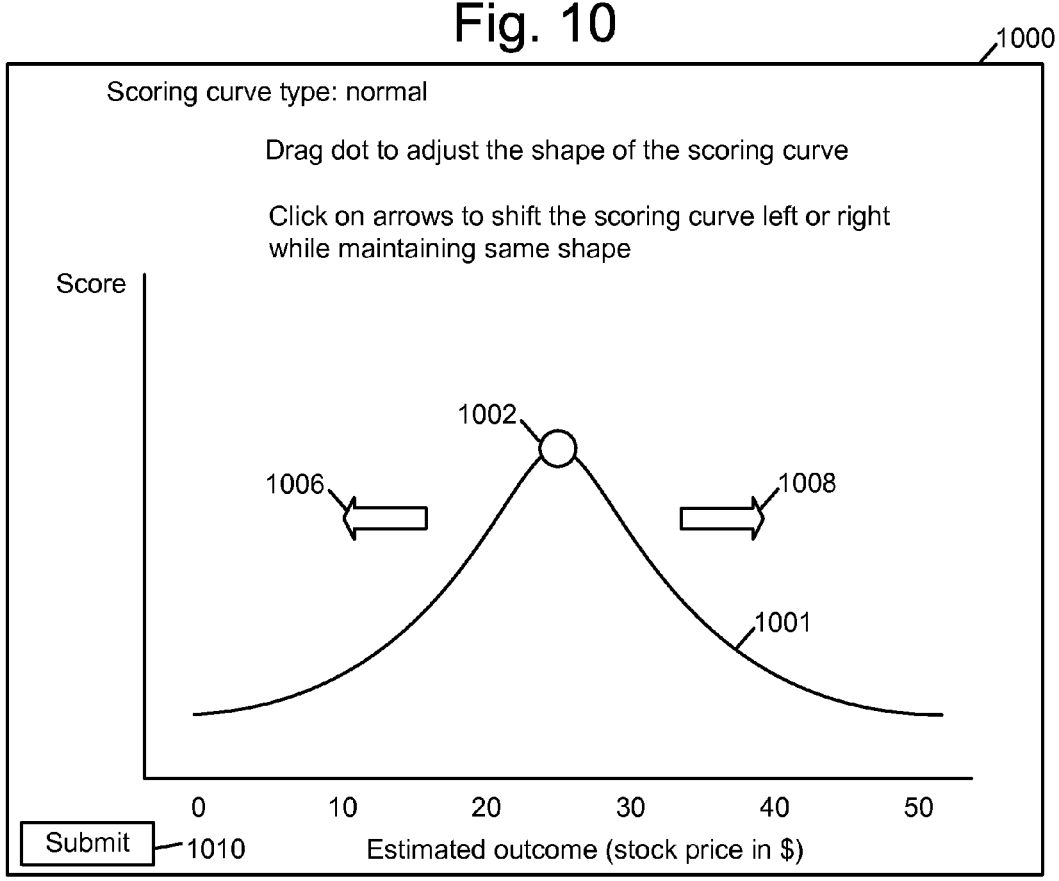

Fig. 16

My forecasting questions —1602
1. How many employees... 1601
Estimate contest
Prediction market How many employees will be in the company at year's end?

Estimate contest

| Possible outcome: | Your estimated probabilities: | Based on your estimated probabilities, the amount you will win upon outcome: |
|---|---|---|
| 24 or fewer | 54% | $3,339 |
| 25 to 27 | 31% | $2,431 |
| 28 to 30 | 15% | $1,760 |
| 31 to 33 | 0% | $1,176 |
| 34 to 37 | 0% | $1,176 |
| 38 or more | 0% | $1,176 |

Make estimates —1604

Prediction market 1610

| Possible outcome: | Cost of bet to win $100 upon outcome: | Your current bets: | Based on your current bets, the amount you will win upon outcome: |
|---|---|---|---|
| 24 or fewer | $35.56 | $0 | $0 |
| 25 to 27 | $17.18 | $2,437 | $17,855 |
| 28 to 30 | $15.23 | $1,777 | $14,042 |
| 31 to 33 | $9.78 | $0 | $0 |
| 34 to 37 | $11.12 | $429 | $4,086 |
| 38 or more | $11.12 | $429 | $4,086 |

Make bets —1612

Fig. 17

My forecasting questions
1. How many employees...
   Estimate contest /1702
   Prediction market Estimate contest - How many employees will be in the company at year's end?
Drag tips of bars to provide your estimate for each outcome

| Possible outcome: | Less likely- 0 | More likely- 100 | Setting | Probability | Reward |
|---|---|---|---|---|---|
| 24 or fewer employees | ▭━━━━━◯ | | 100 | 54% | $3,339 |
| 25 to 27 employees | ▭━━◯ | | 58 | 31% | $2,431 |
| 28 to 30 employees | ▭◯ | | 27 | 15% | $1,760 |
| 31 to 33 employees | ◯ | | 0 | 0% | $1,176 |
| 34 to 37 employees | ◯ | | 0 | 0% | $1,176 |
| 38 or more employees | ◯ | | 0 | 0% | $1,176 |

[Confirm estimates] [Cancel]

Go back to overview /1710        1712 Go to betting page

My forecasting questions
1. How many employees...    1801

Estimate contest
[Prediction market]  1802

Prediction market – Bet on possible outcomes for "How many employees will be in the company at year's end?"

| Possible outcome: | Cost of bet to win $100 upon outcome: | Your current bets: | Based on your current bets, the amount you will win upon outcome: |
|---|---|---|---|
| 24 or fewer | $35.56 | $0 | $0 |
| 25 to 27 | $17.18 | $2,437 | $17,855 |
| 28 to 30 | $15.23 | $1,777 | $14,042 |
| 31 to 33 | $9.78 | $0 | $0 |
| 34 to 37 | $11.12 | $429 | $4,086 |
| 38 or more | $11.12 | $429 | $4,086 |

Starting balance: $10,000
Cash balance: $1,913

/ <=24 \ / 25-27 \ / 28-30 \ / 31-33 \ / 34-37 \ / >=38 \    1811   1810
          1812

Bet for or against "24 or fewer employees"

Move the slider to the right to bet for "<=24" or to the left to bet against "<=24"

⇐ Bet against    Bet for ⇒        1814

Bet: $1,913                          Your bet:        Bet: $1,913
                              1816  $1,000
Win: $2,922          $0          Win: $2,735         Win: $5,111
                                 Odds: 1.735:1

You are currently betting for "<=24" in the amount of $1,000. If "<=24" occurs, you will be paid $2,735.

1818            1820           1822
[Place bet]  [Change bet]  [Cancel]
                                                 1826
Go to summary  /1824                       Manual interface

My forecasting questions — 1902
1. How many employees...          1901
Estimate contest
Prediction market How many employees will be in the company at year's end?

Estimate contest

| Possible outcome: | Your estimated probabilities: | Based on your estimated probabilities, the amount you will win upon outcome: |
|---|---|---|
| 24 or fewer | 54% | $3,339 |
| 25 to 27 | 31% | $2,431 |
| 28 to 30 | 15% | $1,760 |
| 31 to 33 | 0% | $1,176 |
| 34 to 37 | 0% | $1,176 |
| 38 or more | 0% | $1,176 |

Make estimates — 1604

Prediction market                1910

| Possible outcome: | Cost of bet to win $100 upon outcome: | Your current bets: | Based on your current bets, the amount you will win upon outcome: |
|---|---|---|---|
| 24 or fewer | $37.56 | $1,000 | $2,735 |
| 25 to 27 | $17.18 | $2,437 | $17,855 |
| 28 to 30 | $15.23 | $1,777 | $14,042 |
| 31 to 33 | $9.78 | $0 | $0 |
| 34 to 37 | $11.12 | $429 | $4,086 |
| 38 or more | $11.12 | $429 | $4,086 |

Make bets — 1612

COMBINED ESTIMATE CONTEST AND PREDICTION MARKET

CROSS-REFERENCE TO RELATED APPLICATIONS

This application is related to commonly assigned, U.S. patent application Ser. No. 11/855,076, published as US2009/0073174 on Mar. 19, 2009 and issued as U.S. Pat. No. 7,880,741 on Feb. 1, 2011, titled "User interface for expressing forecasting estimates", and U.S. patent application Ser. No. 11/855,085, published as US2009/0076939 on Mar. 19, 2009, titled "Continuous betting interface to prediction market", each of which is filed herewith and incorporated herein by reference.

BACKGROUND

There is much interest in techniques that elicit people's forecasts about the likelihood of future events in order to aggregate the opinions of a group into a meaningful, and, one hopes, accurate, prediction. Two similar, related techniques are estimate contests based on scoring rules, and prediction markets.

Estimate contests are useful in tapping the organizational knowledge of a group. For example, some tech companies provide cash rewards or reputation points (by publishing participant's scores) to employees when they predict a correct outcome for events relating to the company, such as when a software product will ship, or what memory prices will be at a future date. Moreover, predictions of participants who have been correct relatively often in the past can be given a greater weight in future contests.

In prediction markets, participants buy and sell contingent securities in a marketplace. These securities represent the possible outcomes of a given forecasting question. Participants in a prediction market buy and sell these securities with the hope of owning the security representing the correct outcome, which will have a value. By applying market forces and letting people trade in the securities with real money or other valuable commodity, accurate forecasts can be obtained. The marketplace can be structured, for instance, as a continuous double auction (CDA) or a market which has an automated market maker. With a continuous double auction, buyers and sellers indicate how much they are willing to pay to buy a security or how little they will accept to sell a security. With an automated market maker, the system sets the security prices. Examples of prediction markets which are open to the public include the University of Iowa's Iowa Electronic Market, which allows users to predict the results of economic and political events such as elections, the Hollywood Stock Exchange®, in which players buy and sell prediction shares of movies, actors, directors, and film-related options, and HedgeStreet®, which enables users to speculate on economic events.

Prediction markets and estimate contests are similar in that both aggregate the opinions of a group of participants, both divide the possible outcomes into a set of buckets, and both require participants to implicitly or explicitly assign probabilities to each bucket. That is, both systems require participants to express likelihood estimates for future events. For example, an estimate contest might involve asking a group of users to estimate a high temperature for the next day's weather. One user might say that they think there is a 20% chance of a high temperature in the 50's, a 30% chance of a high temperature in the 60's, and a 50% chance of a high temperature in the 70's. To express their opinions, the users can assign a list of probabilities to various outcomes. Or, the users can express the outcome they find most likely (e.g., "The high temperature tomorrow will be 66 degrees.") The users can also express their confidence in the estimate (e.g., "The high temperature tomorrow will be 66 plus or minus 3 degrees"). However, these approaches can be time consuming and error prone when there are many possible outcomes. Moreover, prediction markets can be daunting for many users because they rely on price-per-share and other market and securities metaphors.

Techniques are need for facilitating access to estimate contests and prediction markets.

SUMMARY

Techniques are provided for combining an estimate contest and a prediction market.

In one aspect, a computer-implemented method for trading in a prediction market includes receiving a user input, via a user interface, of a user's estimated probabilities of occurrence of different possible outcomes of an event. For example, the event can relate to stock prices, sports scores, business related events, or other events of interest. The method further includes determining one or more proposed trades in a prediction market based on the user's estimated probabilities. In the prediction market, the user can buy and sell securities which represent the different outcomes. For example, the proposed trades can include trades for securities which represent outcomes which the user believes are likely to occur. An output is provided, via the user interface, which depicts the one or more proposed trades. The output can indicate a trade amount and a potential payoff, for instance. A risk profile of the user can also be used in proposing trades. Thus, the technique can include collecting the estimated probabilities, then using that information to suggest or trade automatically in a prediction market.

In another aspect, a computer-implemented method for forecasting an event includes obtaining estimated probabilities of occurrence of different possible outcomes of an event from user inputs in an estimate contest. Additionally, the method includes obtaining probabilities of occurrence of the different possible outcomes of the event based on securities in a prediction market, e.g., based on costs and payoffs of the securities. The probabilities from the two sources can then be combined to provide a report which provides a greater insight than could be gained by analyzing either source by itself. For example, a report can compare the estimated probabilities of occurrence from the estimate contest for at least one subset of the users, or from individual users, in the estimate contest, to the probabilities of occurrence from the prediction market, where the at least one subset of the users includes less than all users in the estimate contest. The information from the estimate contest tends to provide better insight as to the opinions of individual users or groups of users, while the information from the prediction market tends to provide a better insight as to the opinion of a group as a whole.

In another aspect, a computer readable media having computer readable software embodied thereon for programming at least one processor to perform a method is provided, where the method includes receiving a user input, via a user interface, regarding a user's estimated probabilities of occurrence of different possible outcomes of an event, and regarding a risk level, e.g., a risk seeking or risk averting behavior which the user desires to assume in the prediction market. The method performed further includes determining one or more proposed trades in a prediction market based on the user's estimated probabilities and risk level, and providing an output, via the user interface, which depicts the one or more proposed trades. For example, a risk averse user may buy securities which provide an equal payoff for each outcome to minimize downside losses, a risk seeking user may buy securities for one or more least probable outcomes to maximize upside gains, and a risk neutral user may buy securities to maximize an expected value in the prediction market at a given time or over different times.

This summary is provided to introduce a selection of concepts in a simplified form that are further described below in the description. This summary is not intended to identify key features or essential features of the claimed subject matter, nor is it intended to be used to limit the scope of the claimed subject matter.

BRIEF DESCRIPTION OF THE DRAWINGS

FIG. 3 depicts a process in which a user provides a probability density for use in an estimate contest and/or prediction market.

FIG. 4 depicts a user interface in which a user selects a predetermined probability density or elects to draw a probability density.

FIG. 5 depicts a user interface showing a normal probability density for expressing estimated outcomes.

FIG. 7 depicts a user interface showing a normal probability density with a reduced standard deviation relative to FIG. 5.

FIG. 9 depicts a user interface in which a user selects a predetermined scoring curve or elects to draw a scoring curve.

FIG. 10 depicts a user interface showing a scoring curve for estimated outcomes.

FIG. 16 depicts a user interface which depicts a user's estimates in an estimate contest and bets in a prediction market.

FIG. 17 depicts a user interface related to FIG. 16 in which a user provides estimates for outcomes in an estimate contest.

FIG. 18 depicts a user interface related to FIG. 16 in which a user places bets and in which a user's bets in a prediction market are indicated.

FIG. 19 depicts a user interface related to FIG. 16 in which a new bet has been placed.

DETAILED DESCRIPTION

Techniques are provided for combining an estimate contest and a prediction market. Trades can be made in the prediction market based on a user's estimated probabilities which are expressed for difference outcomes of an event in the estimate contest.

Figure 1:
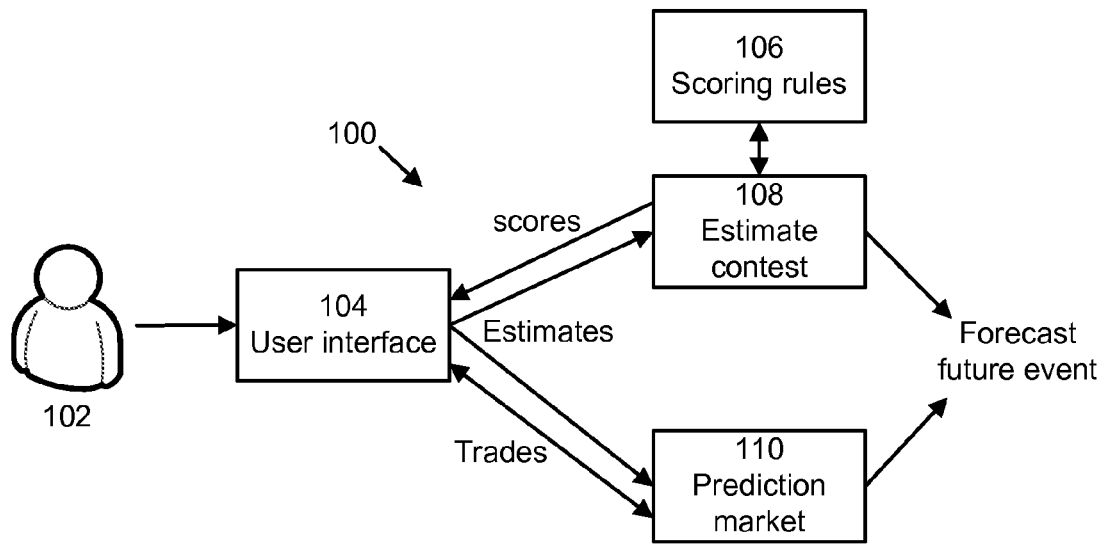
FIG. 1 depicts an overview of a system in which a user participates in an estimate contest and a prediction market.

FIG. 1 depicts an overview of a system in which a user participates in an estimate contest and a prediction market. The system, shown generally at 100, includes a user interface 104 which allows a user 102 to participate in an estimate contest 108 and a prediction market 110, which relate to forecasting a future event. The user interface 104 can be implemented on any type of computing device including a laptop computer, desktop, workstation, cell phone, personal digital assistant or the like. The computing device may include a display screen and an input mechanism such as a keyboard, mouse or other pointing device, voice interface or the like. The input mechanism may be integrated with the screen by using a touch screen which allows the user to touch the screen and manipulate objects on the screen using a finger or stylus, for instance. Via the user interface 104, the user can provide estimates to the estimate contest 108 regarding probabilities of occurrence for specified outcomes of the estimate contest. The probabilities can be scored using scoring rules 106, and the scores provided to the user via the user interface. Also, via the user interface 104, the user can provide estimates to the prediction market 110 and execute trades for securities which represent the different outcomes of the future event.

The estimate contest 108 and prediction market 110 may be implemented on one or more computing devices such as servers which are accessed by the user interface 104 via one or more networks such as the Internet and/or a local area network. In practice, a number of users can interact with the estimate contest and prediction marker via respective user interfaces.

Figure 2:
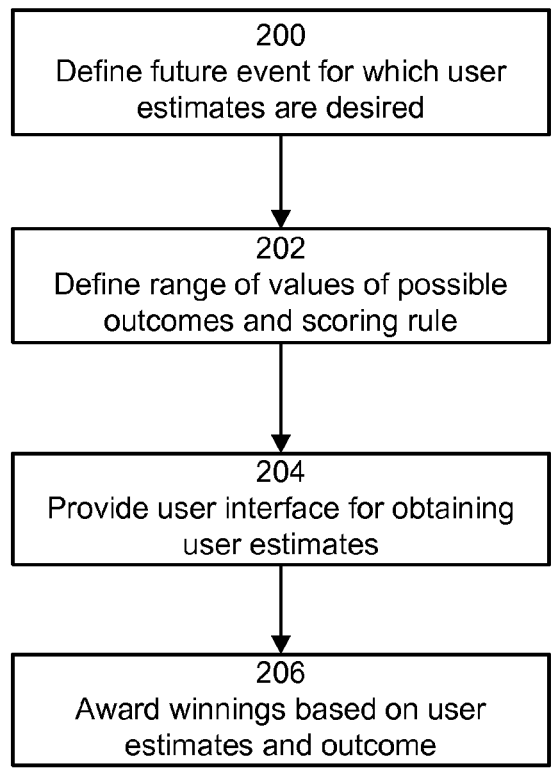
FIG. 2 depicts a process for implementing an estimate contest.

FIG. 2 depicts a process for implementing an estimate contest. An estimate contest can be sponsored by one or more persons or entities that set certain parameters of the contest, such as the future event which is the subject of the contest, different possible outcomes, e.g., buckets, of the future event, a scoring algorithm, who can participate, the time and manner in which users participate, the amount and type of rewards which are provided, and the start and end dates of the contest. Step 200 includes defining a future event for which user estimates are desired. For example, a company may be interested in obtaining the opinions of its employees regarding the expected stock price of the company, for instance, at a given point in time, such as at year's end. Step 202 includes defining a range of values of possible outcomes and a scoring rule. In one approach, the outcomes, rounded to the nearest dollar, may be 0-10, 11-20, 21-30, 31-40, 41-50 and >50. In this case, there are six possible outcomes. In another approach, each outcome is a dollar amount, e.g., 0, 1, 2, 3, . . . , 49, 50 and >50. In this case, there are fifty two possible outcomes. In yet another approach, each outcome is a dollar and cents amount, e.g., 0.00, 0.01, 0.02, 0.03 . . . . In this case, there are thousands of possible outcomes. As can be appreciated, enabling a user to express probability estimates in the form of a curve for a range of many possible outcomes is very convenient and intuitive for the user. Scores are assigned to the outcomes according to a scoring rule and an associated probability density.

Step 204 includes providing a user interface for obtaining the user estimates. Example user interfaces are discussed further below. Step 206 includes awarding winnings based on user estimates and the outcome. At the end of the contest, once the future event which is the subject of the contest occurs, the user estimates can be compared to the actual outcome and awards made. Generally, the users whose estimates are closest to the actual outcome will receive the highest awards, when a proper scoring rule is used. Also, users who predict the actual outcome with a greater probability will receive a greater award than users who predict the outcome with a lower probability. With a proper scoring rule, which includes the logarithmic, spherical and quadratic scoring rules, the greatest expected reward is obtained by telling the truth, e.g., estimating the actual probability of the various outcomes. Specifically, users are maximizing the expected value of the reward, e.g., the average reward weighted by the probability associated with each outcome. The expected value of a reward assigned by a proper scoring rule is always greatest if the user inputs the actual probabilities, i.e., tells the truth. Estimating the probability of the actual outcome at 1 yields the largest possible reward, but if there is any uncertainty, not the largest expected value. For instance, if the underlying event is the flip of a coin, the maximum expected value is obtained by estimating heads at 50% and tails at 50%. Estimating heads at 100% pays the largest reward if the user is right, but has a lower expected value.

The specific winnings that will be paid out may not be known until the contest is over. Generally, any proper scoring rule will provide a greater reward when a user has assigned a greater probability to the actual outcome. Different scoring rules will assign different rewards. For instance, the logarithmic scoring rule is local—the user's score is based only on the probability assigned to the actual outcome. The quadratic scoring rule, on the other hand, penalizes the user for probabilities assigned to other outcomes which did not occur.

Note that a future event can include an event which has not yet occurred as well as an event which has already occurred but the results of which are not known, in which case the release of the outcome of the event is a future event. Further, note that the steps depicted in this and other flowcharts need not necessarily occur in the order shown or as discrete steps.

Graphical user interfaces described herein allow a user to directly express estimates. In one approach, the user draws their estimates on the user interface. In another approach, the user selects from predetermined probability density functions. In either approach, the system provides immediate feedback on how the estimates will be interpreted in the context of a forecasting system, whether it is an estimate contest or a prediction market. The ability to directly manipulate estimates with immediate feedback about their interpretation provides a pleasant, simple user experience and a powerful expressiveness. The techniques described include the ability to directly (free-hand) draw a probability density (PD) over a range of outcomes for the purpose of being scored with a scoring rule, the ability to directly (free-hand) draw a PD over a range of outcomes for the purpose of proposing or executing trades in a prediction market, and the ability to directly manipulate a predetermined PD over a range of outcomes for the purpose of being scored with a scoring rule. In this latter approach, the PD is not a free-hand drawing, but is constrained to be a PD of a given kind. In any case, the PDs can be manipulated on a 2-dimensional (or higher dimensional) tableau where one dimension is the range of values being predicted and the other dimension represents the "confidence" (variance). For example, the user can manipulate a point in 2D space up and down on a y-axis to adjust the user's confidence up and down, respectively. The more confident the user is, the more quickly the score drops off on either side of an estimate.

The techniques described herein further include the ability to directly manipulate a PD over a range of outcomes for use in a prediction market. Also provided is the ability to manipulate the output of a scoring function as applied to a PD. That is, rather than drawing the PD, the user draws the resulting scoring curve from which a PD can be computed.

The techniques include drawing a PD curve, and interpreting that distribution for use in an estimate contest or in a prediction market. The drawing of a PD curve can be done by free-hand to obtain an arbitrary PD. A free-hand drawing of a PD curve can involve the creation, with a mouse or stylus or some other pointing device, of a curve over a range of numbers. By interpreting the height (assuming a horizontal range) as greater probabilities, one can view the curve as a PD curve. Because the area underneath a PD curve must be exactly 1.0, some scaling of the curve may be required. Another aspect involves a parameterized distribution function. Because there are many classes of common probability densities, a user interface can be configured to draw different PDs over ranges of values. This results in a user interface in which one can use a pointing device to adjust the height and mean of the PD.

Further, once the user has provided a probability density, it can be used as an input to either an estimate contest or a prediction market.

The user interface can give instantaneous feedback on how the scoring rule was applied to the distribution, or it could be summarized with accessory graphics, tables or other type of output. Once a user is happy with the distribution they have drawn, they can commit that distribution for use in the estimate contest or prediction market.

A PD used in a prediction market can be interpreted based on the prediction market's outcomes as security prices at which the user would be willing to buy (or sell) those securities. Then, the system can either propose trades to the user, or automatically make those proposed trades.

FIG. 3 depicts a process in which a user provides a probability density (PD) for use in an estimate contest and/or prediction market. A PD allows user to express estimates for a range of different outcomes without inputting tabular information for each possible outcome. This approach is convenient and efficient for the user particularly when there are a large number of possible outcomes or continuous ranges of outcomes. Further, a PD provides an intuitive way to express estimates for different outcomes. The user can select from a number of predefined probability densities or can draw one freehand using a mouse, touch screen or other input technique.

Step 300 includes launching the user interface. In one approach, the user interface is launched when the user visits a web site and enters identifying information such as a user id and password. In another approach, the user interface is provided by software resident on the user's computing device. At step 302, the user interface requests a user input regarding the outcome of a future event. At step 304, the user selects an input mode for expressing estimated probabilities for the outcomes. Different users can select different PDs. For example, at step 306, the user can select a predefined PD, or at step 308, the user can select to draw a freehand PD curve based on estimated probabilities of the outcomes. The user interface can present an x-y graph in which the x axis represents the range of possible outcomes (e.g., a stock price in dollars on a given future date) and the y axis represents the likelihood of a particular price. The user can draw a curve in which the curve is highest for the stock price which the user believes is most probable and lower for other stock prices which the user believes are less probable. It is also possible for the curve to have multiple peaks. For instance, if a user expects that the company will either do very well or very poorly, the user can draw peaks at the low and high ends of the possible outcomes. After drawing a freehand curve, at step 310, the curve is normalized to provide a PD. The normalization adjusts the curve so that the area under it is equal to one.

At step 312, the user interface displays the PD with one or more scores. For each possible outcome, the scoring rule, e.g., algorithm, provides a score based on the user's estimates, as expressed by the PD. For example, assume the user selects a normal (bell curve) PD which has a peak at the stock price of $25 (see also FIG. 5). This means the user believes it is most probable that the stock price will be $25 at year's end. The scoring rule can then immediately calculate a score for an estimate of $25. For example, the estimate of $25 may correlate with a score of 70 points. Generally, the scoring rule can calculate the score everywhere along the curve, not just at the peak. The score is simply highest at the peak, in this example.

Further, at step 314, the user can manipulate the PD using a pointing device, touch screen or other input device. For example, the user can change the shape of the PD and change the position of the PD relative to the possible outcomes. At step 316, the user interface updates the score in real time as the PD is manipulated. This allows the user to see how the score changes when the PD changes. At step 318, once the user is satisfied with the current PD, the user submits the PD as an estimate in the estimate contest and/or a prediction market. The user interface may allow the user to subsequently revise the submission if desired.

FIG. 4 depicts a user interface in which a user selects a predetermined probability density (PD) or elects to draw a PD. The user interface 400 requests that the user enter an estimate for the stock price of ABC Co. at year's end. The user interface indicates that a specific PD type can be selected (i.e., normal, semi-elliptical or triangular) or the user can draw a PD freehand. Note that, in probability theory, a probability density can be continuous or discrete. With a continuous probability density, the probability is expressed in terms of a range of outcomes. For instance, the probability of the outcome being between $20.00 and $20.99 is the integral of the probability density between $20.00 and $20.99. With a discrete probability density, the probability is expressed in terms of a specific outcome. For instance, the probability of the outcome being $20 is the value of the probability density at $20. The user need not be familiar with such concepts, however. The user selects or draws a probability density curve whose amplitude represents the likelihood of the corresponding outcome. The user interface can process the probability density curve as a discrete or continuous function.

The normal, or Gaussian, distribution, is defined by a mean and a standard deviation. The semi-elliptical probability density, also referred to as the Wigner semi-circular distribution, is a probability density supported on the interval [−R, R], the graph of whose probability density function is a semicircle of radius R centered at (0, 0) and then suitably normalized to have an area under the curve of 1 so that it is a semi-ellipse. The triangular probability density is defined by lower and upper limits and a mode at which the peak occurs.

The user can select a probability density (PD) by clicking on an appropriate radio button or other input widget, for instance, then clicking on the "continue" button. Other example probability densities which can be used include the Bernoulli and Poisson distributions. Any type of probability density can be used. The user interface can provide a thumbnail image of each PD as well. For example, thumbnail images 402, 404 and 406 are provided for the normal, semi-elliptical and triangular probability densities, respectively.

A normal PD slopes gradually from both sides of a peak, where the slope is reduced further away from the peak. A semi-elliptical PD slopes relatively more gradually near its peak but the slope is higher further away from the peak. A triangular PD slopes away from its peak at fixed rate. With these three PD choices, the user may select the normal PD as a middle ground if the user believes the outcome at the peak value of the PD is relatively likely to occur. The user may select the semi-elliptical PD in a conservative approach if the user is less confident that the outcome at the peak value of the PD will occur since this PD assigns similar probabilities to a wider range of outcomes than the normal PD. The user may select the triangular PD in a more aggressive approach if the user is more confident that the outcome at the peak value of the PD will occur since the probability drops off relatively quickly as the outcomes move away from the peak.

Again, these PDs are examples only which are meant to illustrate how a user can express probability estimates for different outcomes.

Moreover, as mentioned, the user can manipulate the shape of a PD curve to best express the user's probability estimates. Assuming the user selects the normal PD curve from the user interface 400 of FIG. 4, the user interface 500 of FIG. 5 is displayed.

FIG. 5 depicts a user interface showing a normal probability density for expressing estimated outcomes. Note that the user interfaces can be displayed as windows which appear together, e.g., in a tiled or side by side manner, or one after another. Any type of display techniques may be used. The user interface 500 includes an x-y graph in which the estimated outcomes, e.g., stock price in dollars, appear on the x axis and the likelihood is represented by the y axis. For a discrete PD, the likelihood is the same as the probability, whereas for a continuous PD the likelihood is a generalized representation of probability. The range of the stock prices is set by the sponsor of the estimate contest, and ranges from 0 to $50 in this example. The x-y graph further includes the normal PD curve 501 and a dot 502 or other icon at the peak of the PD curve 501. Text in a graphic bubble 504, for instance, points to the peak of the PD curve and indicates a score for the estimated outcome which is aligned with the peak. In this case, a score of 70 is assigned to an estimated outcome of $25, as depicted by the notation "Score(25)=70". Scores can be displayed for other values of the PD 501 as well, e.g., in $5 increments, in one possible approach. The display may be configured as desired by the user.

As a default, the PD curve 501 can be centered initially at the center of the range of estimated outcomes. In another approach, the user interface 400 of FIG. 4 may prompt the user to enter a value at which the PD curve will be centered, for instance.

If the user is satisfied with the current PD and its position with respect to the estimated outcomes, the user can click on the "Submit" button 510 to have the PD entered into the estimate contest. Additional processing can be performed to read the PD for the different buckets of the estimate contest. For example, if the buckets are for one dollar ranges, e.g., $0-1.00, $1.01-2.00, . . . , the PD can be read for each range. For instance, for the bucket $0-1.00, the PD can be read at the value of $0.50, e.g., the midpoint of the range of the bucket, assuming a discrete PD, or the PD can be integrated between $0-1.00, assuming a continuous PD. Each user's submission can be processed and stored accordingly until the outcome is known. For instance, the values for a user which are stored may include a user id and data which indicates the probability and score for each bucket or outcome. An overall estimation of the probability of each outcome occurring, for a group of users, may be made by aggregating the estimates provided by each user, e.g., using an average, mean or other statistical metric.

Once the outcome is known, the values can be processed automatically to assign winnings to the users. The amount that a user is awarded will depend on the scoring rule used and the probabilities that the user assigns to the set of outcomes. Most scoring rules determine the score at a particular point based not just on the prediction at that point, but based also on all other predictions. In the case of a PD, that means that the entire curve is an input to the computation of the score at a particular point. On the other hand, the logarithmic scoring rule, for instance, depends only on the probability estimate for a given outcome. Optionally, software may be used for reporting the winnings, e.g., via the user interface, email, web site or the like. Further, results from multiple estimate contests may be stored, and users' winnings from each contest tracked, e.g., to identify users who tend to be right more often than others. Such users can be assigned a higher weight so that in subsequent contests, their estimates are considered more heavily in aggregating the user estimates. Additionally, further rewards can be provided for users who have demonstrated their ability to estimate outcomes more accurately than others over time.

The user may not be satisfied with the current PD and its position with respect to the estimated outcomes. For example, the user may want the peak probability to be over some other estimated outcome. To this end, the user interface 500 instructs the user to drag the dot 502 to adjust the shape of the probability curve, and to click on the arrows to shift the probability curve left or right while maintaining the same shape. In the latter case, the user can click on arrows 506 and 508, or use another appropriate input technique, to shift the PD 501 left or right, respectively, relative to the estimated outcomes. Clicking on the right arrow 508 results in the user interface 600 of FIG. 6.

In addition to using a 2d x-y graph, other multi-dimensional visualizations may be used. For example, a PD may have three parameters, e.g., if it is left-right asymmetric, which the user can adjust. A 3d input mechanism could be used in this case.

Figure 6:
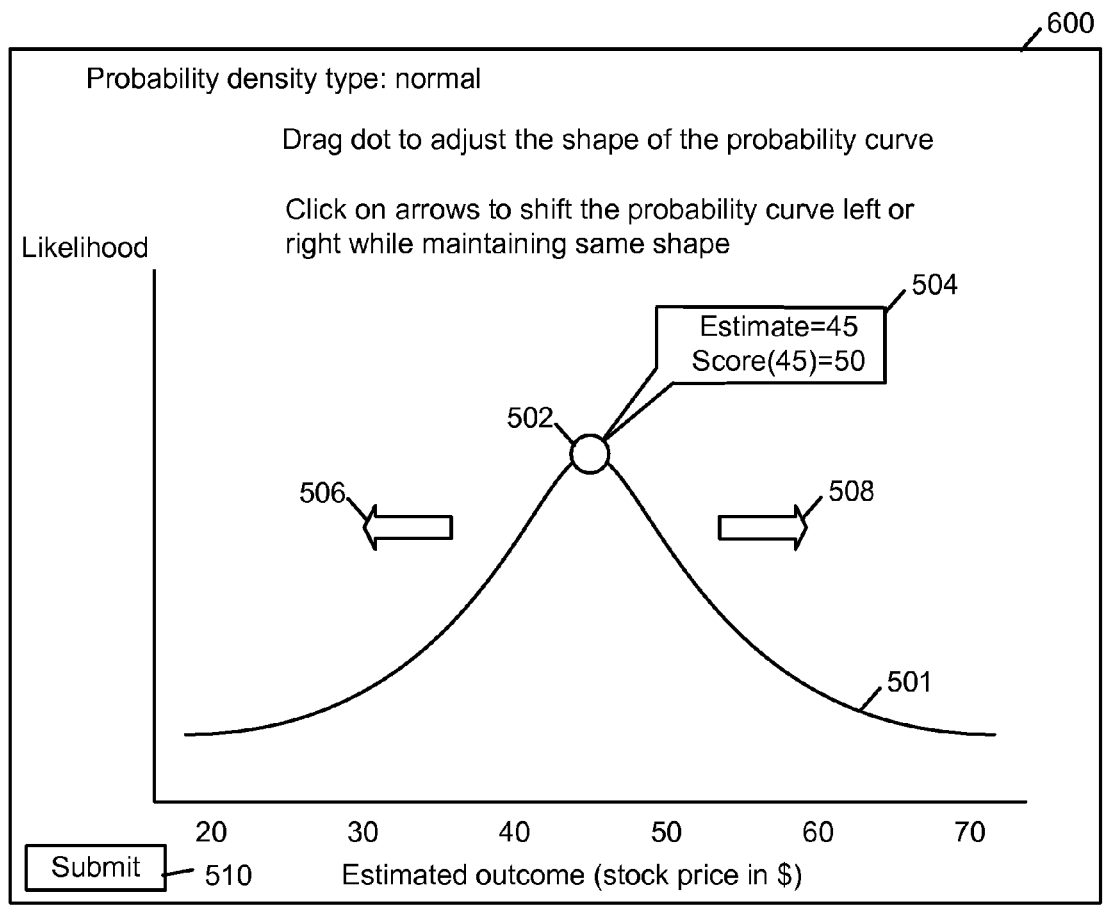
FIG. 6 depicts a user interface showing a normal probability density whose peak is at a different estimated outcome relative to FIG. 5.

FIG. 6 depicts a user interface showing a normal probability density whose peak is at a different estimated outcome relative to FIG. 5. In the user interface 600, the peak of the curve 501, which is also the mean for this PD, is now aligned with an estimated outcome of $45 instead of $25. In this approach, the values on the x-axis shift relative to the curve. Another approach is to shift the position of the curve 501 relative to the x-axis while the values on the x-axis remain constant. Text in the graphic bubble 504 now indicates that a score of 50 is assigned to an estimated outcome of $45, as depicted by the notation "Score(45)=50". The user can thus shift the PD with respect to the different outcomes until it is at a desired position. Note that the score can be updated in real time as the user manipulates the PD.

As mentioned, the user interface 500 of FIG. 5 also allows the user to drag the dot 502 to change the shape of the PD 501. For example, dragging the dot 502 upward results in the PD of FIG. 7.

FIG. 7 depicts a user interface showing a normal probability density with a reduced standard deviation relative to FIG. 5. In the user interface 700, the PD 701 is narrower, i.e., has a reduced standard deviation, relative to the PD 501 of FIG. 5. The user may choose this shape for the PD instead of the PD 501 if the user believes that the outcome at the peak, e.g., $25, is very probable to occur. Note that the area under the PD is maintained at unity so that the PD narrows when its peak is raised. Similarly, the user can drag the dot 502 downward to obtain a relatively flatter PD, e.g., if the user believes that the outcome at the peak, e.g., $25, is less probable to occur. The score is tied directly to the payout, so dragging the dot 502 upwards will increase the score. This corresponds to greater certainty on the part of the user, in which case the user takes more risk in making a prediction. In this example, the score for an estimate of $25 is 90, which is greater than the score of 70 for the same estimate in FIG. 5 due to the greater probability associated with the estimate. On the other hand, dragging the dot 502 downward will flatten the curve and decrease the score since this corresponds to less certainty on the part of the user, in which case the user takes less risk in making a prediction. Further, by narrowing the PD so that it has a more pronounced peak, as depicted by the PD 701 compared to the PD 501, the probabilities for outcomes which are further from the peak become lower, so that the user receives a lower award if one of those outcomes is correct.

Figure 8A:
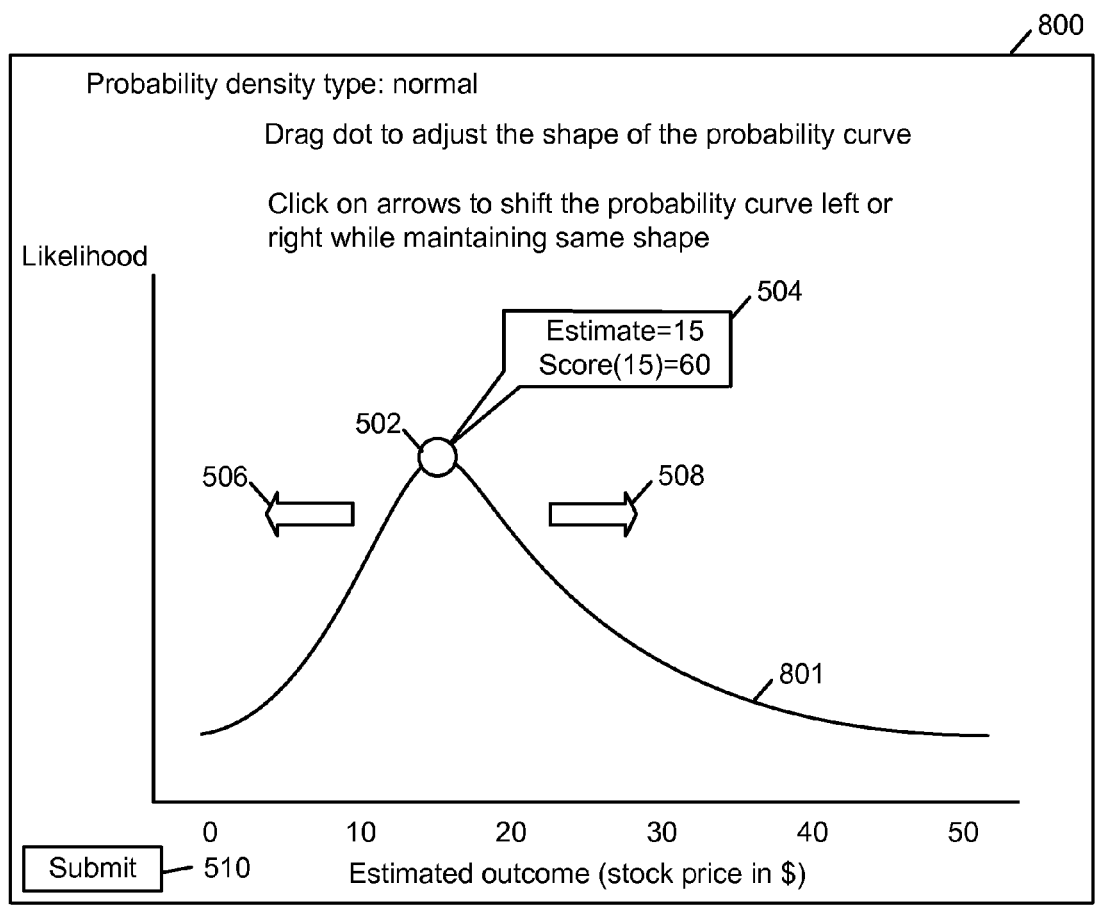
FIG. 8a depicts a user interface showing a skewed probability density.

In another example, the user drags the dot 502 in the user interface 500 of FIG. 5 to the left to obtain the PD of FIG. 8*a*.

FIG. 8*a* depicts a user interface showing a skewed probability density. The user interface 800 depicts a skewed PD 801 in which the peak is aligned with an outcome of a stock price of $15. Text in the graphic bubble 504 now indicates that a score of 60 is assigned to an estimated outcome of $15, as depicted by the notation "Score(15)=60". The user can continue to manipulate the PD until a final PD is submitted by selecting the "Submit" button 510. An option may also be provided which allows the user to save one or more PDs and analyze and edit them further before providing a submission.

Other interface tools may be used which allow the user to manipulate a probability curve in different ways. For example, a user may click and drag any point of the curve to move that point to a new position in the graph, while neighboring points are adjusted automatically using curve fitting techniques to conform to the new position.

Figure 8B:
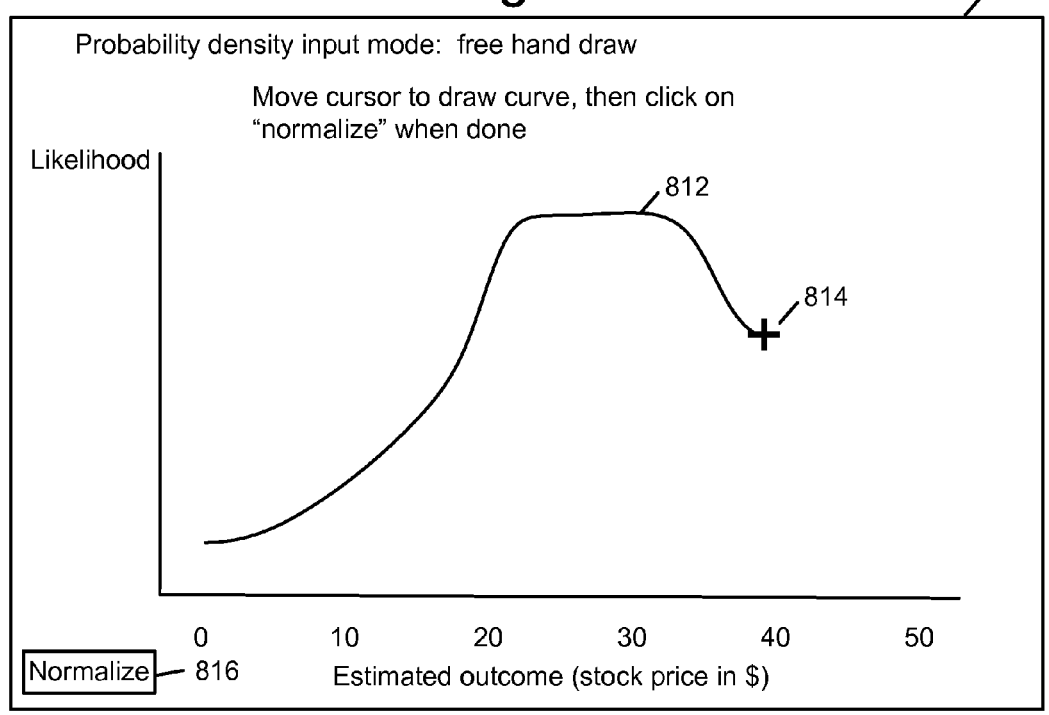
FIG. 8b depicts a user interface in which a user free hand draws a probability density curve.

FIG. 8*b* depicts a user interface in which a user free hand draws a probability density curve. The user interface 810 may be provided after the user selects the option in the user interface 400 of FIG. 4 to freehand draw a probability density. The user interface 810 instructs the user to move the cursor 814 to draw a curve, then click on a "normalize" button 816 when done. Here, the probability density is partially drawn, as indicated by the curve 812. The user has drawn a curve which is relatively flat in the region between $20-35, indicating that the user wishes to assign a relatively equal probability to outcomes in that range. The user continues drawing and selects the "normalize" button 816, resulting in the user interface 820 of FIG. 8c. In another possible approach, the user selects a few points in the graph and selects a curve fitting function to draw a line which passes through the points. The user may also call up a probability curve which was previously drawn and edit and/or submit it.

Figure 8C:
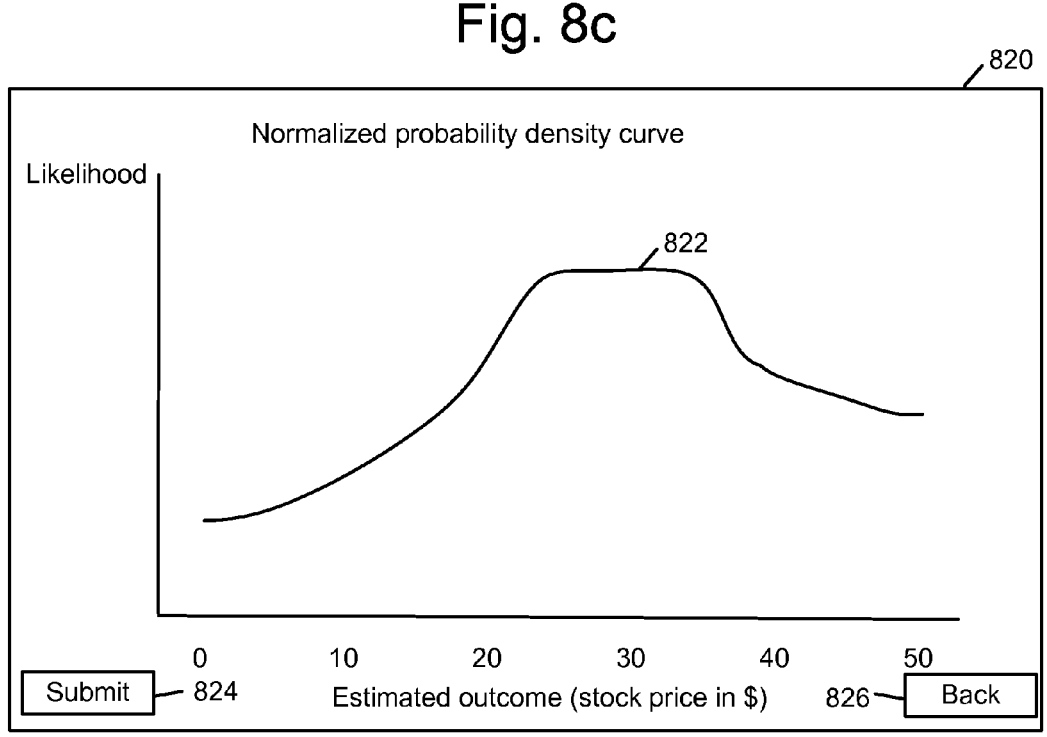
FIG. 8c depicts a user interface showing the probability density of FIG. 8b after being normalized.

FIG. 8c depicts a user interface showing the probability curve of FIG. 8b after being normalized to a probability density 822. Values of the PD 822 correspond to probabilities of different outcomes occurring, and the area under the curve is unity. The PD 822 essentially has the same shape as the curve 812 which is drawn by the user but is flattened somewhat, in this example, to depict the normalizing. This process can be performed using known techniques. If the user is satisfied with the PD, the user clicks on the "Submit" button 824 to submit the PD for use in an estimate contest and/or prediction market, for instance. Otherwise, the user can click a "back" button 826 to draw another probability curve. Note that tools may also be provided which allow a user to manipulate a hand drawn curve so that the curve need not be re-drawn. For example these tools can include curve dragging and shifting tools as discussed previously.

FIG. 9 depicts a user interface in which a user selects a predetermined scoring curve or elects to draw a scoring curve. As mentioned previously, e.g., in connection with step 202 of FIG. 2, the sponsor of an estimate contest can define a scoring rule for the contest. Once the scoring rule is set by the sponsor of an estimate contest, for instance, it is applied equally to all users in an estimate contest. A score can thereby be defined for each outcome and associated probability. In some cases, the scoring rule takes into account all estimates when computing the score of a given outcome. In other cases, the scoring rule takes into account only the estimate for the given outcome. Further, via the interface 900, the users who participate in the estimate contest can manipulate a scoring curve, which is the output of the scoring function as it is applied to a probability density. Users do not manipulate the scoring function itself. This can be an alternative way for a user to define a probability density, as the probability density can be determined by the output of the scoring function, e.g., the scoring curve.

In one possible approach, a user interface 900 can be employed which allows the sponsor to select from among predetermined scoring curves, such as normal 902, semi-elliptical 904 and triangular 906, or to draw a scoring curve freehand. This approach is analogous to that used for allowing the user to select and manipulate a probability density. Note that the shape of the scoring curve depends on the probability density to which the scoring function is applied. Also, any user can use the interface to provide a scoring curve, and a corresponding probability density can be obtained from it for use in an estimate contest or prediction market.

The scoring function can be of any type. Examples include quadratic, logarithmic and spherical. The quadratic, logarithmic and spherical scoring functions can be understood as follows. Let a vector $\vec{p}=(p_1, \ldots p_n)$ be an n-vector of probabilities, where $p_i$ is the probability that outcome i is correct, and the sum of these probabilities is equal to one. Then, the quadratic scoring rule can be represented by $Q_i(\vec{p})=2p_i-\vec{p}\cdot\vec{p}$, where $Q_i(\vec{p})\in[-1, 1]$. The logarithmic scoring rule can be represented by $L_i(\vec{p}p)=\ln(p_i)$, where $L_i(\vec{p})\in[-\infty, 1]$. The spherical scoring rule can be represented by $$S_i(\vec{p}) = \frac{p_i}{\sqrt{\vec{p}\cdot\vec{p}}}, \text{ where } S_i(\vec{p}) \in [0, 1].$$

These are examples only, as other scoring rules may be used as well. Note that these formulae are for discrete outcomes. Corresponding formulae for continuous PD distributions can similarly be used, as will be apparent to those skilled in the art. Moreover, a scoring curve can be translated to a probability density according to the same relationships. For instance, many standard probabilities densities are parameterized by two values: the mean and the variance. The scoring curve can similarly be expressed in terms of the mean and the variance. One can then interface map every point in the x-y plane to a mean and variance, and send those values to both formulas.

Once the user clicks on the "continue" button in the user interface 900, the user interface 1000 appears. Here, we assume the normal scoring curve is selected.

In an example scenario, a contest sponsor might specify that the logarithmic scoring rule is going to be used with normal curves for the contest. Users could then drag around the peak of a scoring curve which represents the output of the scoring rule. This means the user is dragging around a curve representing what the user will get as a reward for each possible outcome. This is all the user cares about, so the user need not be concerned with probabilities and probability densities. A goal is to connect the user's input and the rewards, leaving the probabilities to the underlying system to use to produce forecasts.

FIG. 10 depicts a user interface showing a scoring curve for estimated outcomes. As mentioned, the scoring curve represents a scoring rule applied to a probability density. Thus, a given scoring curve will translate to a probability density based on the scoring rule. Likewise, different scoring curves will translate to different probability densities based on the scoring rule. The scoring rule is generally set by the sponsor of an estimate contest, for instance, and applied to all of the users/participants equally. In some cases, the probability density will have a similar shape as the scoring curve. For example, for a quadratic scoring rule, the probability density and the scoring curve are both normal, although different in units and displacement on the y-axis. Thus, a graph of the probability density and the scoring curve would be similar. In other cases, the probability density and the scoring curve have different shapes.

The user interface 1000 includes an x-y graph in which the estimated outcomes, e.g., stock price in dollars, appear on the x axis and the score appears on the y axis. Units for the score are not depicted, but can have any range of values. The x-y graph further includes a scoring curve 1001 and a dot 1002 or other icon at the peak of the curve. If the user is satisfied with the current scoring curve and its position with respect to the estimated outcomes, the user can click on the "Submit" button 1010 to save the scoring curve for use in the estimate contest.

If the user is not satisfied with the current scoring curve and its position with respect to the estimated outcomes, the user can use the arrows 1006 and 1008 to shift the scoring curve to the left or right, respectively, and/or drag the dot 1002, as discussed previously in connection with manipulation of a PD. Thus, the user interface 1000 allows the user to directly manipulate the scoring curve, which is output of the scoring function, rather than the probability density itself. This is a reasonable implementation and design point.

For example, for forecasting the stock price, the user can directly manipulate the scoring curve by drawing a curve which indicates different winnings for different stock prices. For instance, the curve can indicate winnings of $50 if the stock price is $20, $60 if the stock price is $30, $35 if the stock price is $40, and so forth. The scoring rule itself is not changed in this case. Instead, the user is manipulating the score that the scoring rule will compute based on underlying probabilities. Generally, the score and the winnings/payoff are the same, although it is also possible for a payout to be scaled to a score. The user can select a scoring curve that he or she is comfortable with, and the user interface can determine a corresponding PD for use in an estimate contest and/or prediction market, for instance.

Figure 11:
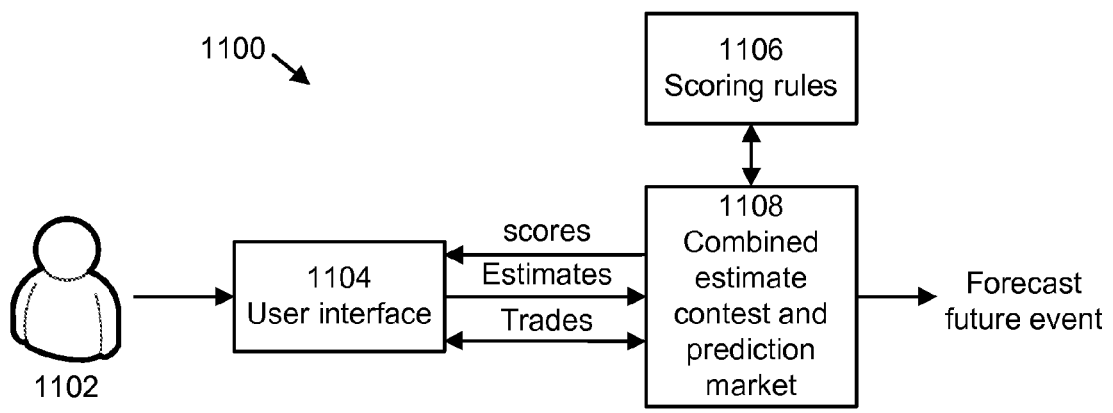
FIG. 11 depicts an overview of a system in which a user participates in a combined estimate contest and prediction market.

FIG. 11 depicts an overview of a system in which a user participates in a combined estimate contest and prediction market. The system, shown generally at 1100, includes a user interface 1104 which allows a user 1102 to participate in a combined estimate contest and prediction market 1108, which relates to forecasting a future event. As before, the user interface 1104 can be implemented on any type of computing device. Via the user interface 1104, the user can provide estimates to the combined estimate contest and prediction market 1108 regarding probabilities of occurrence for specified outcomes. The probabilities can be scored using scoring rules 1106, and the scores provided to the user via the user interface. Also, via the user interface 1104, the user can execute trades for securities which represent the different outcomes of the future event.

As mentioned at the outset, both estimate contests and prediction markets can be used to forecast future events. These techniques both aggregate the opinions of a group of participants, divide the possible outcomes into a set of buckets and require participants to implicitly or explicitly assign probabilities to each bucket. Prediction markets are quite popular, but many people find the concept daunting. Estimate contests are not as popular, but they are conceptually simpler. A combined system may be simpler for a participant than a prediction market alone.

Further, in one approach, participation in the estimate contest can guide participation in a prediction market. Differences between user provided estimates and the current predictions (status) of a prediction market can be detected and used to guide the user to advantageous actions. For example, a robotic or automated trading mechanism can be used to translate estimates directly into prediction market trades. Further, a notion of risk aversion can be used to adjust the robotic trades to a user's comfort zone, e.g., a risk comfort level.

Generally, participants in an estimate contest provide estimates in the form of probabilities assigned to each member of the set of possible outcomes. Estimate contests reward participants based on the eventual outcome and the probabilities that participants placed on the potential outcomes. The reward is computed from a scoring function. While any type of scoring function can be used, most contests choose to use a proper scoring rule.

Participants in a prediction market trade contingent securities that represent the same set of possible outcomes that were defined in the estimate contest. Participants buy and sell these securities for cash (or virtual cash or other commodity) with the hope of accumulating securities that represent the ultimate outcome. Values of the securities are contingent on representing the eventual outcome—the correct security has value and the rest have no value. There are also prediction markets in which the ultimate value of the security is proportional to (or some other function of) a natural value of the underlying event. For instance, consider a market security representing a percentage market share as a number of units of currency. Such a security would have a final value of $33 if at the end of the market, the market share of the product in question was 33%. Generally, any value function can be used. Traders exchange cash for securities in one of two ways typically. One approach involves trading with a market maker which always stands ready to buy or sell any security, while another approach involves trading via a continuous double auction, in which participants can post their interest to buy or sell a given security at a given price. The techniques provided herein can be used with any trading system.

In one approach, given the estimates in the estimate contest and the current state of a prediction market over the same set of outcomes, a computer program can compare the estimates to the probabilities (prices) in the prediction market (as determined by the market maker or the continuous double auction) and look for places where they differ. Security prices in a prediction market can be interpreted as probabilities, based on the ratio of the cost to the payoff. Any difference represents a trading opportunity to which the participant's attention can be guided. The system could propose a trade to the participant to simplify trading. The system could pick the "best" trade by some metric, or propose a set of different advantageous trades.

In another approach, given the estimates in the estimate contest and the current state of a prediction market over the same set of outcomes, a computer program could propose a set of simultaneous trades to a participant. Further, the system could allow interaction with the user such that the user could adjust his or her risk aversion to smooth out the set of proposed trades. An infinitely risk averse trader would want to buy the same amount of every security. A perfectly risk neutral trader would want to trade in the most advantageous securities only. A slider or other gadget can allow a smooth adjustment of possible risk averse portfolios from which the participant can choose. Or, the system could present a sampling of different sets of trades from which the participant can choose.

Figure 12:
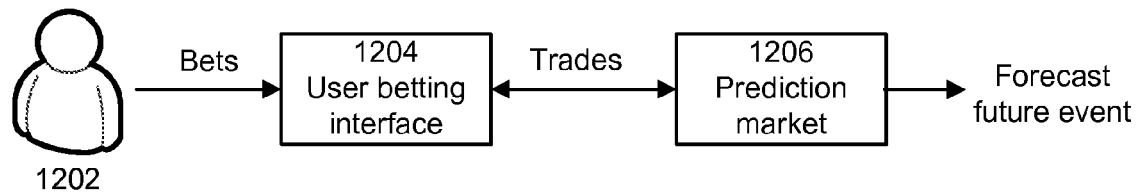
FIG. 12 depicts an overview of a system in which a user betting interface is provided for a prediction market.

FIG. 12 depicts an overview of a system in which a user betting interface is provided for a prediction market. The system, shown generally at 1200, includes a user betting interface 1204 which allows a user 1202 to place bets which are converted to trades in a prediction market 1206, which relates to forecasting a future event. As before, the user betting interface 1204 can be implemented on any type of computing device. Via the user betting interface 1204, the user can provide estimates regarding probabilities of occurrence for specified outcomes. The probabilities can be used to suggest trades. Also, via the user betting interface 1204, the user can execute trades for securities which represent the different outcomes of the future event using betting metaphors rather than securities trading metaphors.

As mentioned, in prediction markets, many participants are put off by the market and securities metaphor. Further, while the market metaphor provides direct support for predicting that something will happen, predicting that something will not happen with a given probability can be problematic. In contrast, a user interface that promotes a betting metaphor can directly and seamlessly support bets for and against possible outcomes. Such a user interface can hide the details of the underlying market structure (e.g., a continuous double auction or market maker) behind a continuously updating view of potential proposed bets. The user can bet on the outcome of a prediction market without knowing that there are securities or that they trade at certain prices. Instead, participants see a proposed bet that they can accept or reject. Such a betting interface can be intuitively understood by most users. Further, continuous, real-time updating of the view of the proposed bets can be made as alternatives are being explored by the user.

For example, the user can buy a security, e.g., contract, that has value contingent on some event happening, e.g., a security is worth $100 if team A wins a football game, and the security is worth $0 is team A loses. The user might pay $25 for the security knowing it will be worth $0 or $100. However, the idea of a contingent security can be difficult to understand for many people. But, people have an intuitive feel for what it means to bet, e.g., I bet that team A will win, and I'll give you 2:1 odds that they will win. A user betting interface, described further below, allows the user to place a bet, that is, risk some money for a potential reward. The interface hides the fact that contingent securities are being bought and sold in a prediction market. Further, the user interface allows the user to easily adjust the size of the bet, that is, the amount the user is willing to risk, and tells the user how much he or she will be rewarded if the outcome which is bet on is correct. This is a classic betting metaphor.

Prediction markets typically rely on a continuous double auction or an automated market maker to determine how many securities are available for purchase for a given total price and, similarly, how many securities one may sell for a given total price. While details change, the interface provided herein is independent of market structure.

Specifically, from the continuous double auction or market maker, it can be determined how much it would cost to buy (or sell) any number of securities or bundles of securities. Thus, it can be determined how much it would cost to bet on the outcome(s) represented by those securities. In other words, for a given size bet, one can determine what betting odds one would get. It is also possible to construct the price of betting against a given set of outcomes by constructing a bet on all of the competing outcomes simultaneously.

Further, a user interface as provided herein allows a user to directly manipulate the size of trades while obtaining instant feedback about proposed bets. Such an interface allows exploration to find a comfortable bet and then "one-click" execution of such a trade/bet. One possible implementation of the user interface uses a slider in which movement in one direction represents ever increasing bets for an outcome and movement in the opposite direction represents ever increasing bets against that same outcome.

Further details regarding the above-mentioned features are provided below.

Figure 13:
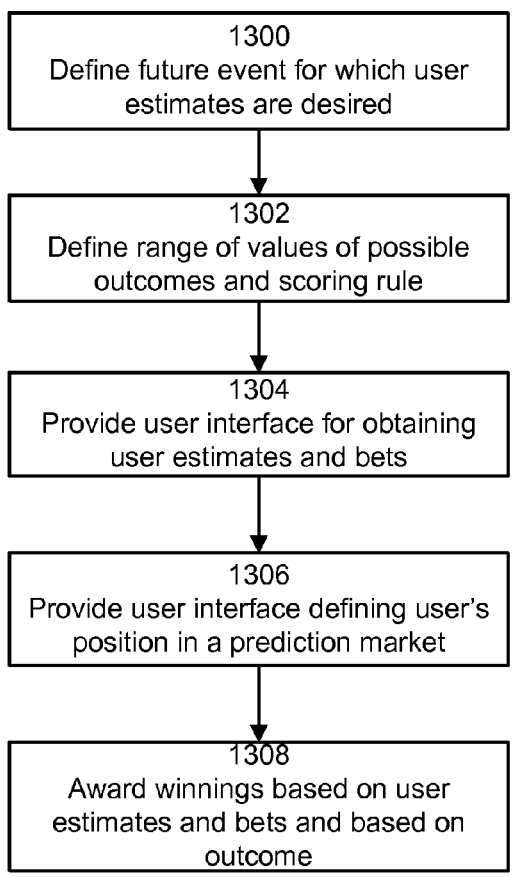
FIG. 13 depicts a process for implementing a combined estimate contest and prediction market.

FIG. 13 depicts a process for implementing a combined estimate contest and prediction market. Step 1300 includes defining a future event for which user estimates are desired. Step 1302 includes defining a range of values of possible outcomes and a scoring rule. The scoring rule is typically set by the sponsor of the combined estimate contest and prediction market and applied to all users equally. Step 1304 includes providing a user interface for obtaining user estimates and bets. Step 1306 includes providing a user interface defining a user's position in a prediction market. Step 1308 includes awarding winnings based on user estimates and bets and based on the outcome of the future event.

Figure 14:
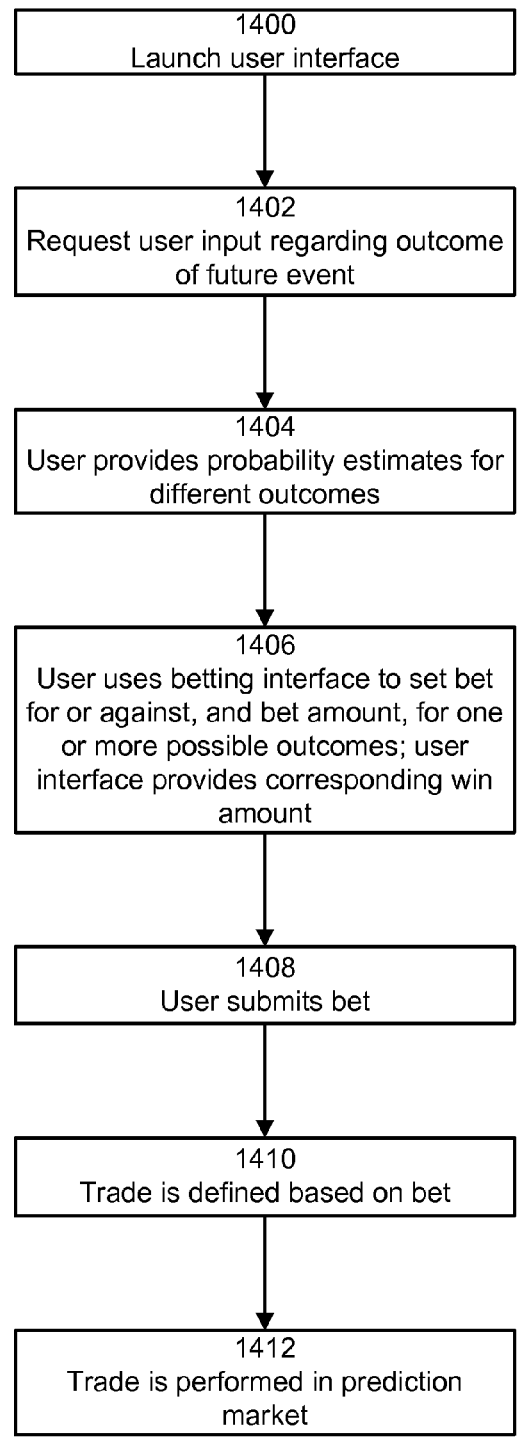
FIG. 14 depicts a process for implementing a user betting interface to a prediction market.

FIG. 14 depicts a process for implementing a user betting interface to a prediction market. Step 1400 includes launching the user interface. Step 1402 includes requesting that a user provide input regarding the outcome of a future event. Step 1404 includes the user providing probability estimates for the different outcomes. Step 1406 includes the user using the betting interface to set a bet for or against one or more outcomes, while also setting a bet amount. The user interface provides a corresponding win amount if the outcome is true.

Step 1408 includes the user submitting a bet. Step 1410 includes defining a trade, or multiple trades, based on the bet. Step 1412 includes performing the trade in the prediction market.

Figure 15A:
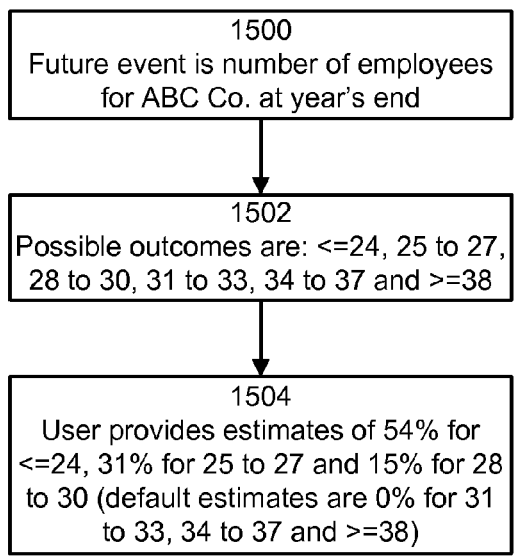
FIG. 15a depicts a process for receiving user estimates for different outcomes in a combined estimate contest and prediction market.

FIG. 15a depicts a process for receiving user estimates for different outcomes in a combined estimate contest and prediction market. In this example, step 1500 indicates that a future event is the number of employees for ABC Co. at year's end. Step 1502 indicates that the possible outcomes are <=24 employees, 25 to 27 employees, 28 to 30 employees, 31 to 33 employees, 34 to 37 employees and >=38 employees. Step 1504 indicates that the user provides estimates of 54% for <=24 employees, 31% for 25 to 27 employees and 15% for 28-30 employees. Default estimates of 0% are used for the remaining outcomes, which are 31 to 33 employees, 34 to 37 employees and >=38 employees. See also FIG. 17.

Figure 15B:
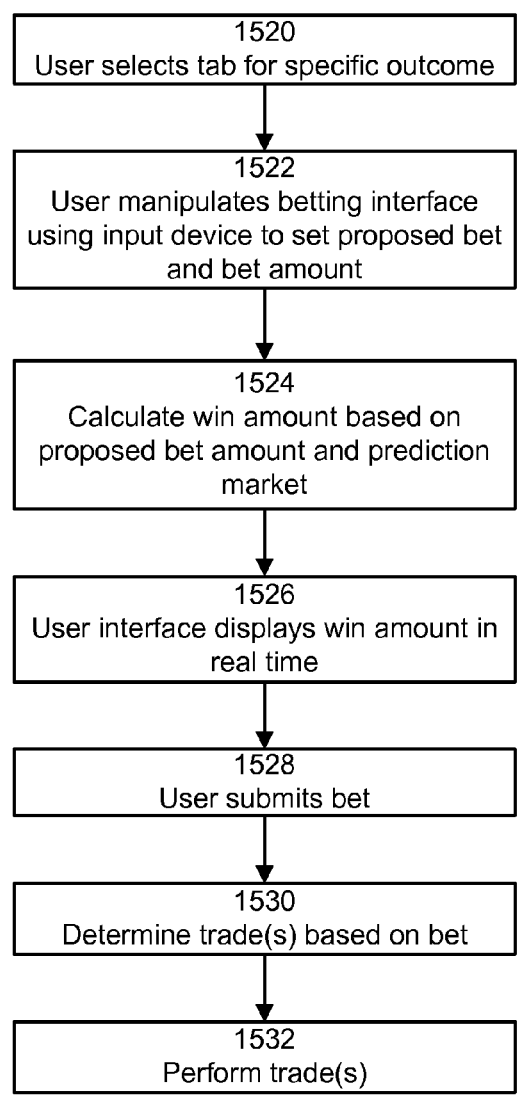
FIG. 15b depicts a process for receiving user estimates and bets for different outcomes in a user betting interface to a prediction market.

FIG. 15b depicts a process for receiving user estimates and bets for different outcomes in a user betting interface to a prediction market. Referring also to FIG. 18, step 1520 includes the user selecting a tab for a specific outcome. For example, the user interface 1800 includes a lower region 1810 which includes a number of tabs 1811, one for each outcome. Tab 1812 represents the outcome of <=24 employees. Step 1522 includes the user manipulating a betting interface using an input device to set a proposed bet and a bet amount. For example, the user can manipulate a marker 1816 in a slider tool 1814.

Step 1524 includes calculating a win amount based on the proposed bet amount and the state of the prediction market. For example, the prediction market provides the winnings for a particular bet and bet amount. At step 1526, the user interface displays the win amount for the proposed bet in real time. Thus, the win amount is provided for any position of the marker 1816. For example, a bet of $1,000 results in a win amount of $2,735. At step 1528, the user submits the proposed bet. At step 1530, one or more trades are determined based on the bet. At step 1532, the trade or trades are performed.

FIG. 16 depicts a user interface which depicts a user's estimates in an estimate contest and bets in a prediction market. The user interface 1600, which is a summary page, includes an upper region 1601 which relates to an estimate contest and a lower region 1610 which relates to a prediction market. The user interface 1600 thus relates to a combined estimate contest and prediction market. Highlighted text 1602 indicates that the user is responding to a particular forecasting question. One or more forecasting questions may be organized under the text "My forecasting questions." The forecasting question is: "How many employees will be in the company at year's end?" The upper region 1601 provides a summary of the possible outcomes, the user's estimated probability for each outcome, and the amount that the user will win based on the estimated probabilities.

Initially, before the user has provided any inputs, the estimated probabilities and winnings can be set at zero. The user can then select a button 1604 ("Make estimates") to view the interface 1700 of FIG. 17 to select a probability for each outcome, as described further below, and then return to the user interface 1600. The user can also enter probabilities using a probability density as described, e.g., in connection with FIG. 4. In the upper region 1601 of the interface 1600 of FIG. 16, the probability estimates which are selected by the user are displayed with the corresponding winnings. The estimated probabilities and winnings are depicted by horizontal bars, in one possible approach, to allow the user to easily understand their relative magnitudes. Other user interface techniques can be used as well. For the outcome of <=24 employees, the estimated probability is 54% and the winnings will be $3,339 if that outcome is true. For the outcome of 25 to 27 employees, the estimated probability is 31% and the winnings will be $2,431 if that outcome is true. For the outcome of 28 to 30 employees, the estimated probability is 15% and the winnings will be $1,760 if that outcome is true. For the remaining outcomes, the estimated probability is 0% and the winnings will be $1,176 if any of those outcomes is true. Note that, with the quadratic scoring rule, the maximum reward is obtained by estimating one outcome at 100% and all the others at 0%. In this case, the user receives the maximum reward if the 100% outcome occurs and no reward if another outcome occurs. But, as soon as the user expresses any uncertainty at all, the reward for the 0% outcomes becomes greater than zero.

The maximum reward for a single outcome can be set by the sponsor of the estimate contest. In an example of the quadratic scoring rule, the total score is $$S = a + b\left(2p_i - \sum_{i=1}^{n} p_i^2\right)$$

where $p_i$ represents the probability estimate a user makes for outcome i. The sponsor can adjust the two constants 'a' and 'b' to adjust the maximum reward for a single outcome. In this example, the reward is set to range from $0 to $4,000 for any single outcome. To provide a $4,000 maximum payout, the sponsor sets a=b=$2,000. Thus, the maximum score, with $p_i$=1 is S=2,000+2,000(2×1−1)=$4,000 and the minimum score is 2,000+2,000(2×0−1)=0. Different scoring rules can use different parameters.

The total winnings vary with the users' estimates. For instance, if one user estimates a single outcome with a probability of 100% and all other users estimate the same outcome with a probability of 0%, then the winning user's reward will be $4,000 if that outcome occurs, or $0 if another outcome occurs. In this case, the total reward is $4,000. On the other hand, if a user estimates all outcomes equally with a probability of 17%, then the reward for each outcome is $2,333, based on an example scenario. The underlying scoring rule indicates how much to offer for each set of probabilities. The scoring rules should allow users to maximize their reward by telling the truth, based on incentive compatibility.

The lower region 1610 of the interface 1600, which relates to a prediction market, depicts the possible outcomes, which are the same as the outcomes in the estimate contest. Also depicted is the instantaneous cost of a bet to win a specific amount, such as $100. Note that, due to the nature of the underlying market, the ratio of bet cost to winnings (payoff-to-cost ratio) can vary with the size of the bet, other bets placed by users, and other market conditions, so that the cost of a bet to win $1,000, for instance, is not necessarily ten times the cost of a bet to win $100. For example, a large bet may require securities to be purchased in different lots at different prices. The cost of a bet can generally be described by a complex pricing function in which the quantity purchased affects the price. The user interface hides these facts and the underlying complexities. However, these details are known by the system since the status of the market is known, so that a bet can be translated into an order for shares at any given moment. The market can compute quantity given security price, or security price given quantity. Further, the cost of the bet to win $100 can vary at different times, days, etc., as the market changes. The cost provided is therefore the instantaneous price of the underlying contingent security for an outcome. Note that prediction markets can provide share prices, including fractional share prices. In this case, if a bet is for $150 and the instantaneous share price is $70, a user might be able to purchase 2.128 shares, depending on the elasticity constant the market is using. In markets that don't have fractional shares, the system can round down to a whole number of shares. The bet for $150 can be rounded down to a bet for two shares, or the user could be required to bet in amounts corresponding to whole shares. Further, in practice, we can round numbers internally to six digits after the decimal point, for instance, but display less than that to the users. So, placing a bet and then immediately selling it can result in the loss of a small fractional amount of currency. But, again, any bet can always be mapped to some number of shares in any prediction market. And, the number of shares obtained by placing the bet can be displayed as the return on the bet, after being multiplied by the value of each share if that outcome occurs.

Note that the cost of the bet to win $100 is also the probability of that outcome occurring as expressed by the prediction market, e.g., a $35.56 cost to win $100 represents a 0.3556 probability. Further, the cost of the bet to win $100 can be expressed as odds, e.g., (100−35.56)/35.56:1=1.81:1 odds. Thus, the prediction market probability and/or odds could also be provided by the user interface. The odds can also be updated in real time in the user interface as the user explores different bet amounts, where the odds are determined according to at least one security in the prediction market.

Nevertheless, $100 or some other specific amount provides a reference point for allowing the user to compare the ratio of bet cost to winnings for the different outcomes. This information is obtained from the underlying market, which provides securities for each outcome. The lower region 1610 also depicts the user's current bets for each outcome and the corresponding winnings if the outcome is true. The user's current bets are obtained from user inputs and the winnings are calculated based on the current bet and the prediction market. The cost of the bet and the winnings are depicted by horizontal bars, in one possible approach, to allow the user to easily understand their relative magnitudes. The current bet is depicted by a marker on a horizontal scale in which a left side of the scale represents a bet against an outcome and the right side of the scale represents a bet for the outcome. Other user interface techniques can be used as well.

Initially, before the user has provided any inputs, the current bets and the winnings can be set at zero. The user can then select a button 1612 ("Make bets") to view the interface 1800 of FIG. 18 to place a bet for one or more of the outcomes, as described further below, and then return to the user interface 1600. The lower region 1610 of the user interface 1600 indicates that, for the outcome of <=24 employees, a bet of $35.56 is needed to win $100, a bet amount is $0 and the winnings are $0 (i.e., no bet has been placed for this outcome). For the outcome of 25 to 27 employees, a bet of $17.18 is needed to win $100, a bet amount is $2,437 and the potential winnings are $17,855. For the outcome of 28 to 30 employees, a bet of $15.23 is needed to win $100, a bet amount is $1,777 and the potential winnings are $14,042. For the outcome of 31 to 33 employees, a bet of $9.78 is needed to win $100, a bet amount is $0 and the potential winnings are $0. For the outcome of 34 to 37 employees, a bet of $11.12 is needed to win $100, a bet amount is $429 and the potential winnings are $4,086. For the outcome of >=38 employees, a bet of $11.12 is needed to win $100, a bet amount is $429 and the potential winnings are $4,086. The bet amount represents an amount placed at risk by the user for a particular outcome.

As mentioned, the cost represents the probability of the associated outcome. For example, the cost of $35.56 to win $100 indicates that the prediction market has collectively assigned that outcome a probability of 0.3556. This allows a direct mapping from bet cost to probability.

The estimate contest and the prediction market are designed to run over the same underlying question and set of outcomes. However, there need not be a direct connection between them. In one approach, described further below, we are interested in exploring how a set of estimates could turn into automatic trading or trading advice for the user.

FIG. 17 depicts a user interface related to FIG. 16 in which a user provides estimates for outcomes in an estimate contest. As discussed in connection with the top region 1601 of the user interface 1600 of FIG. 16, the user can select the button 1604 to obtain the user interface 1700 to provide an estimate for each outcome. The text 1702 indicates that the user is providing estimates in an estimate contest. In one possible approach, the user drags a tip of a bar for each outcome to set a corresponding probability. For example, for the outcome <=24 employees, the user drags the tip 1704 of a bar 1703. Here, the bar is dragged to a setting of 100, indicating the highest probability. For the outcome 25 to 27 employees, the user drags the bar to a setting of 58. For the outcome 28 to 30 employees, the user drags the bar to a setting of 27. For the other outcomes, the bar is set at 0. The probability is then determined based on the bar settings. For example, the bar setting of 100 corresponds to a probability of 100/(100+58+27)=54%, the bar setting of 58 corresponds to a probability of 58/(100+58+27)=31%, and the bar setting of 27 corresponds to a probability of 27/(100+58+27)=27%. The sum of the probabilities is 100%. Various other interface techniques besides a bar can be used to indicate the user's probability settings. Further, in a manual mode, the user can type in the setting or probability directly. In any case, the user can then select a button 1706 ("Confirm estimates") to view the interface 1600 of FIG. 16 with the estimates stored. The estimates can be deleted by selecting the button 1708 ("cancel"). The user can select the text 1710 ("Go back to Overview") to return to the interface 1600 of FIG. 16, or the user can select the text 1712 to go to a betting page of FIG. 18.

Note that the user interface 1700 could also be used to obtain user estimates for outcomes in a prediction contest, e.g., for the purpose of auto-trading or providing trading advice. In this case, the reward information would not apply and need not be displayed. In an estimate contest, the user provides estimated probabilities for each outcome, and is paid the reward associated with the outcome that occurs. In a prediction market, the user makes a bet for or against outcomes, and winning bets are paid when the actual outcome is known. Further, in some cases, it is not necessary to collect user estimates for the prediction market. For example, trades could be automatically suggested based on market conditions and a user risk profile.

FIG. 18 depicts a user interface related to FIG. 16 in which a user places bets and in which a user's bets in a prediction market are indicated. As discussed in connection with the bottom region 1610 of the user interface 1600 of FIG. 16, the user can select the button 1612 to obtain the user interface 1800 to make bets on one or more outcomes. The text 1802 indicates that the user is providing inputs to a prediction market. The interface 1800 includes an upper portion 1801 which repeats the information in the lower portion 1610 of the interface 1600 of FIG. 16. The upper portion 1801 also indicates an example starting balance for the user of $10,000 and a current cash balance of $1,913. A lower portion 1810 of the interface 1800 includes a number of tabs 1811, one for each outcome, as discussed previously. The user interface organizes bets regarding the different possible outcomes of the event under the different tabs. Tab 1812, which represents the outcome of <=24 employees, is currently selected by the user, such as by clicking on the tab. The selected tab can be highlighted as indicated, color coded or the like. The user can then place bet for or against the selected outcome. Once a bet is placed for a first outcome, the user can select another tab and place a bet or against the corresponding outcome, and so forth. Of course, this is one possible user interface example. Other examples may allow the user to view and/or place bets for multiple outcomes concurrently.

The slider tool 1814 is manipulated by the user and automatically updated in real time. For example, the slider tool indicates that the user has a balance of $1,913, so the proposed bets range from a bet of $1,913 against the outcome of <=24 employees, at the far left of the slider, to a bet of $1,913 for the outcome of <=24 employees, at the far left of the slider. The slider indicates that the winnings are $2,922 for the bet of $1,913 against the outcome, and $5,111 for the bet of $1,913 for the outcome. The user can move the marker 1816 using a mouse or other input device to any desired position along the slider. As the marker is moved, the bet amount and corresponding winnings are provided in real time. For example, for a bet amount of $1,000, the winnings are $2,735. The slider tool 1814 also displays the odds for each bet. For example, winnings of $2,735 based on a bet of $1,000 represents odds of (2,735−1,000)/1,000:1=1.735:1 as indicated. The winnings can account for any transaction cost so that the amount won is decreased by the transaction costs. The winnings are updated in real time as the marker 1816 is moved to change the bet amount. The prediction market probability and/or odds of winning could also be provided by the user interface, and updated in real time as the user explores different bet amounts by manipulating the slider tool. For example, the odds can be provided near the "Win" amount. It is also possible to provide the odds without providing the payoff in the user interface. The user interface may be configured by the user to select the specific information which is provided using check boxes, drop down menus or other input mechanisms.

The slider tool is an example interface mechanism. Many other interface mechanisms can be used. For example, a knob can be rotated, or a lever can be moved, to select a bet amount. Further, the slider tool, knob, lever or other mechanism can be presented in the context of an image of a gambling machine such as a slot machine or the like. The mechanism can provide a continuous range of bet amounts based on user inputs. Further, a minimum increment or granularity can be associated with the range of bet amounts. Also, a movement of the tool can correspond with a change in bet amount.

Further, regarding the use of tabs 1811, one for each outcome, which allow the user to explore and place bets on the different outcomes one after another, it is also possible to provide a user interface which allows the user to explore and place bets for or against one or more outcomes concurrently. For example, a selection mechanism might allow the user to select a set of outcomes to remain neutral on, and another set to bet for or against. In one possible implementation, the outcomes are listed in a column and checkboxes are provided in rows, one row for each outcome. One checkbox in each row may be set initially to remain neutral on the outcome. A checkbox for "bet for" and one for "bet against" can also be provided so that the user can select positions for multiple outcomes. A common advantage in any case is presenting a transaction in a market as a bet, thus greatly simplifying the user's experience.

Note that a bet for an outcome can be translated into a purchase of a security representing that outcome occurring. A bet against an outcome can translate into a sale by the user of a contingent security representing that outcome occurring. However, typically, the user does not have such a security for sale. A user can also bet against an outcome by selling short the contingent security representing that outcome occurring. This approach can be complex and the user might take on too much risk. Another approach is based on the understanding that a betting against an outcome is equivalent to bet for all other outcomes. Thus, a bet against the outcome "<=24 employees" can be translated into a bet for the other outcomes, e.g., 25-27, 28-30, 31-33, 34-37 and >=38 employees and the purchase of the corresponding securities. In one possible approach, the amount bet can be allocated equally among the other outcomes. Thus, a bet of $1,000 against the outcome of <=24 employees can be translated to bets for each of the five other outcomes. The amount bet on each of the five other outcomes can be such that the number of shares of the associated contingent security is equal for each of the five other outcomes. Again, for simplicity, this translation need not be known by the user.

The winnings are updated in real time as the proposed bet amount changes and as market conditions change. For example, the same bet amount can result in different winnings at different times due to changes in the market, e.g., based on bets placed by other users. The user can thus explore different bets for different outcomes to see the corresponding winnings, based on the current market conditions, and decide on which bets to place. Additional text can be provided in the user interface 1800 to explain the proposed bet to the user, e.g., "You are currently betting for "<=24" in the amount of $1,000. If "<=24" occurs, you will be paid $2,735." This text is updated in real time as the proposed bet changes.

Using button 1818 ("Place bets"), the user can place the proposed bet for the currently selected outcome or for all outcomes on which a bet was made. Generally, the user can execute trades for each outcome separately or together, and the user does not have to place a bet on each outcome. Button 1820 ("Change bet") allows the user to change the current bet, and a button 1822 ("Cancel") allows the user to cancel the current betting session. Text 1824 ("Go to summary") allows the user to return to the interface 1600. Text 1826 ("Manual interface") allows the user to manually enter a bet, such as by typing in a bet amount using a keypad. Once the bets are placed, a user interface 1900 is provided.

FIG. 19 depicts a user interface related to FIG. 16 in which a new bet has been placed. The user interface 1900 includes an upper region 1901 which relates to an estimate contest and a lower region 1910 which relates to a prediction market. The upper region 1901 is the same as the region 1601 of FIG. 16. Highlighted text 1902 indicates that the user is responding to a particular forecasting question. The lower region 1910 corresponds to the lower region 1610, but the bet status is updated. In particular, the user has made an additional bet for $1,000 for the outcome of <=24 employees, as discussed in connection with FIG. 18. The winnings for this bet are $2,735, as depicted. Further, the cost of a bet to win $100 has increased from $35.56 in FIG. 16 to $37.56 in FIG. 19 as an illustration of the fact that each bet in a market can change the market.

As mentioned, $37.56 represents the instantaneous price of the underlying contingent security. When the user proposes a bet to the system, it determines how much the price will rise due to the proposed bet, and that determines how many shares the user will receive. The user sees this as a return on the bet. Advantageously, the user can propose a bet in terms of bet size rather than a number of shares of a contingent security, for instance betting $1,000 on the <=24 outcome. In this case, the underlying price for a bet on the outcome of <=24 employees will increase the cost to $37.56, and the user will pay slightly more for each fraction of a share that is bought as part of this bet. Generally, the value of a bet fluctuates with market prices; hence, the odds are not fixed, although the payout is fixed. This is different from what happens with traditional betting. The user interface maintains simplicity for the users by accounting for such details in its underlying algorithms without confusing the users. When a user proposes a new bet, the odds shift in the other direction as the bet amount increases. Thus, here, the cost of the bet for the outcome of <=24 employees increased by $2.00 when the user proposed a bet for that outcome.

The initial odds for the outcome of <=24 employees before the user proposed the $1,000 bet, as depicted in FIG. 16, are (100−35.56)/35.56:1, or 1.81:1. Betting $1,000 raised the market price, so the new instantaneous odds are (100−37.56)/37.56:1, or 1.66:1. The actual odds that a user receives on the $1,000 bet are driven by the odds getting slightly worse with each infinitesimal fraction of the bet. In this case, the odds are (2,735−1,000)/1,000:1, or 1.74:1. Note that this is the halfway point between the instantaneous starting and ending odds. This can all be confusing to end users, so the user interface can simply inform the user of the winnings for particular bets. The user moves the slider until they are comfortable with a bet, and then places the bet. Underlying math algorithms are used to make the system work and to prevent abuse. For example, the algorithms can avoid exploitation such as cash pumps, in which users take cash out of the marketplace.

Figure 20:
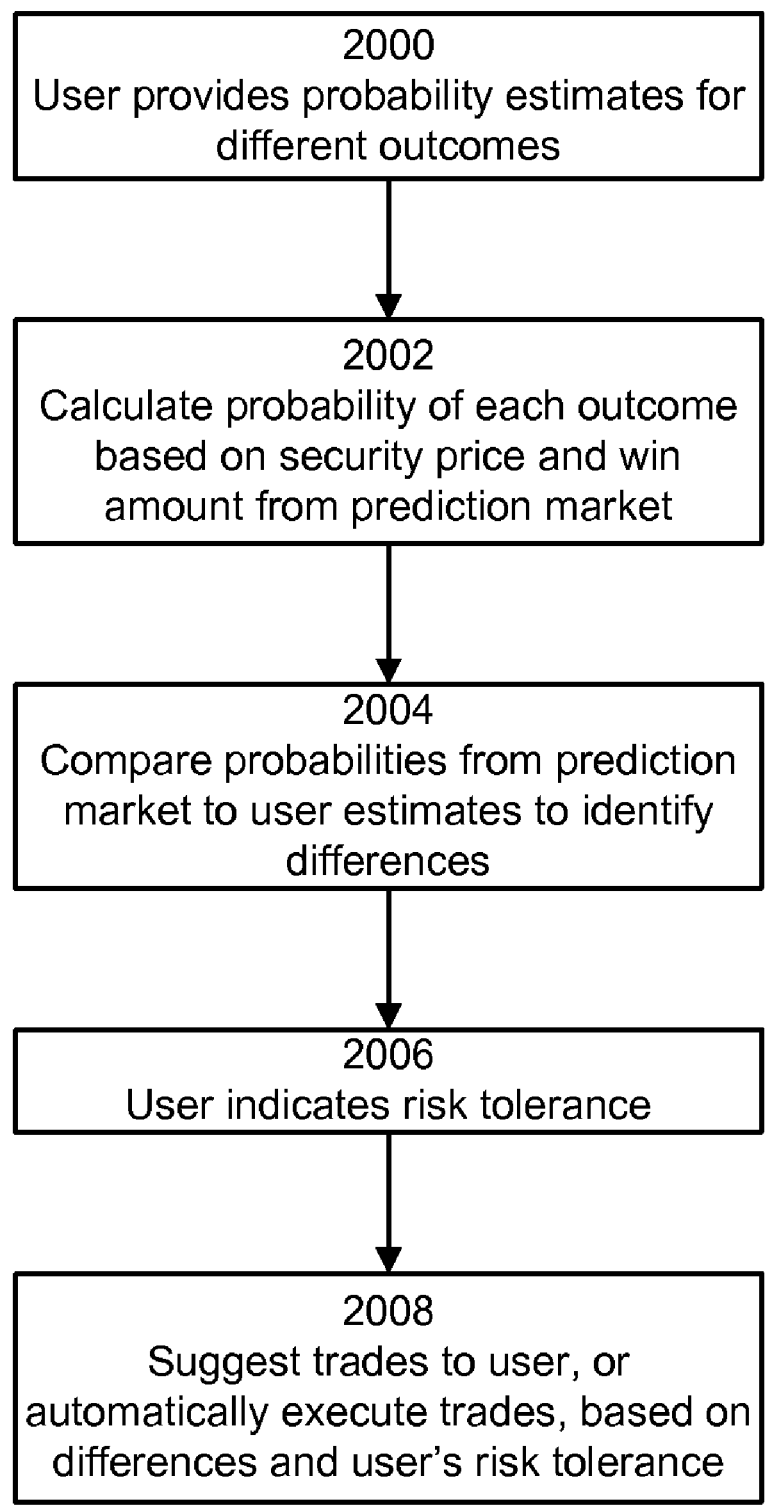
FIG. 20 depicts a process in which trades in a prediction market are suggested based on a user's probability estimates and risk profile.

FIG. 20 depicts a process in which trades in a prediction market are suggested based on a user's probability estimates and risk profile. At step 2000, the user provides probability estimates for different outcomes. For example, this can be done via an interface such as that in FIG. 17 in which a separate probability for each outcome is set, or via an interface such as that in FIG. 5 in which a probability density is set. At step 2002, the probability of each outcome is calculated based on a security price and a win amount from a prediction market. As mentioned, the cost of a security represents the probability of the associated outcome. For example, the cost of $35.56 to win $100 indicates the prediction market has collectively assigned that outcome a probability of 0.3556.

The calculated probability can differ from the user's estimates. Step 2004 includes comparing the probabilities from the prediction market to the user estimates to identify differences. At step 2006, the user indicates a risk profile. Step 2008 includes suggesting trades to the user, or automatically executing trades, based on the differences and the user's risk profile. One trade or a set of trades can be suggested.

Note that the user's estimated probabilities could be used to advise the user on how he or she might consider trading, leaving the user free to bet based on the market prices and the user's beliefs about the likelihood of each outcome. Knowing the user's risk profile allows this advice to be provided. Once the risk profile is known, the system can provide advice and/or automatically trade in the prediction market, as discussed below. For example, when the user's probability exceeds the market's probability for an outcome, a trade to buy a security which represents the outcome can be made. Or, when the user's probability is less than the market's probability for an outcome, a trade to sell a security which represents the outcome can be made.

Figure 21:
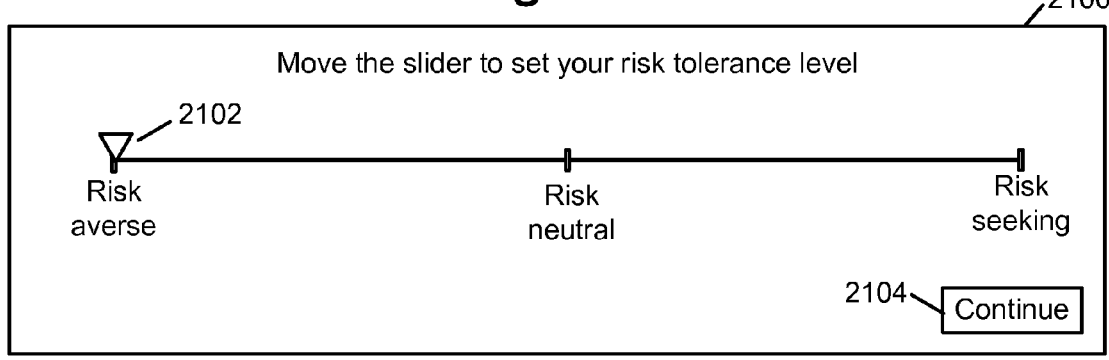
FIG. 21 depicts a user interface in which a user sets a risk profile.

FIG. 21 depicts a user interface in which a user sets a risk profile. The user interface 2100 includes a slider tool with a marker 2102 which the user can move to indicate his or her risk profile. In this case, the user indicates he or she is risk averse. As mentioned previously, the user interface can allow interaction with the participant such that the participant could adjust his or her "risk aversion" to smooth out the set of proposed trades. A risk averse trader would want to buy the same amount of every security. A risk neutral trader would want to trade in the most advantageous securities. A risk seeking trader would favor trading in riskier securities. Generally, risk seeking trades will take into account both the differences in user estimates and prevailing prices and a bit of a long-shot bias. In the extreme case of infinite risk seeking, the trade can be for the lowest price security independent of the trader's beliefs; but, for a more moderate risk seeker, the trade may avoid a bad-bet long-shot in favor of a different, more realistic bet. Generally, various techniques for formulating trades in a market based on risk profile can be used.

The user selects the "Continue" button 2104 to submit the risk profile and to have corresponding proposed bets automatically suggested.

Figure 22:
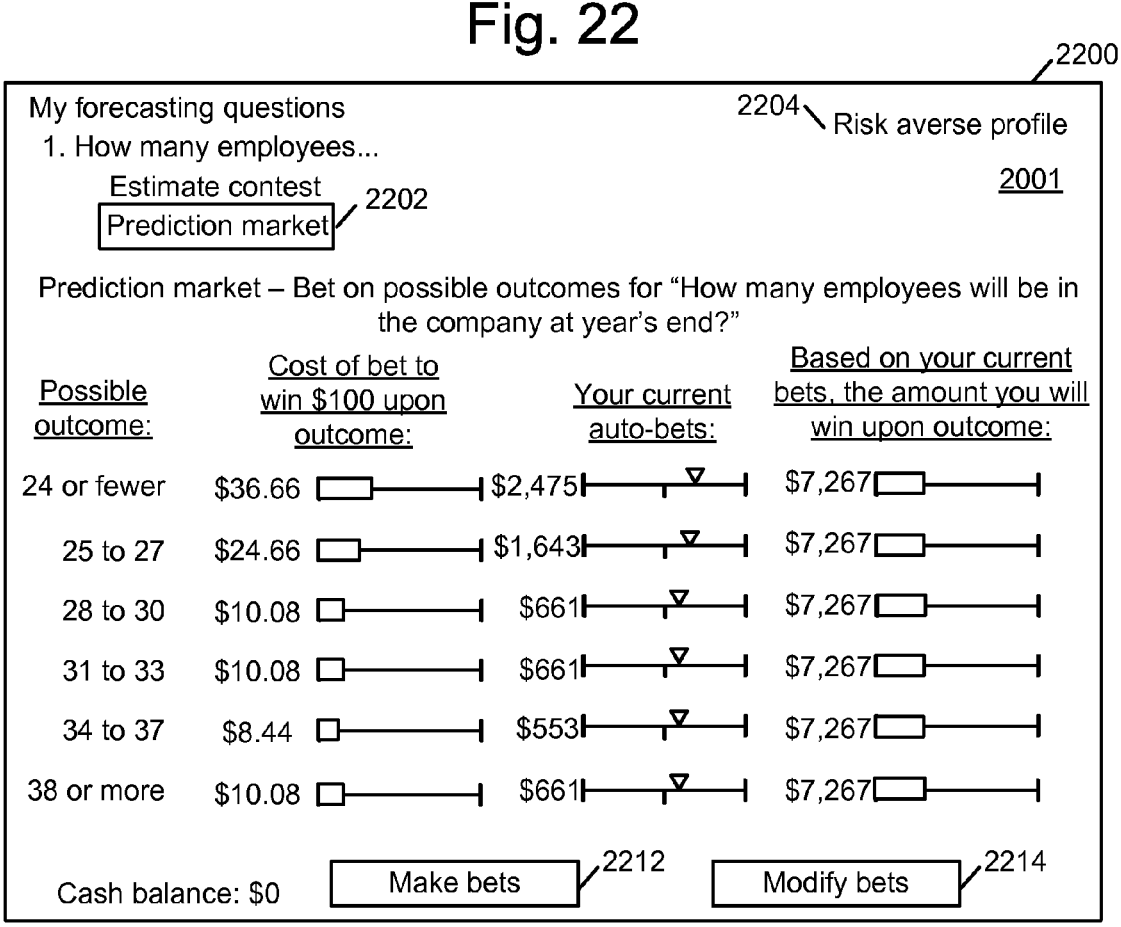
FIG. 22 depicts a user interface in which a user's bets in a prediction market are indicated, for a risk averse profile.

FIG. 22 depicts a user interface in which a user's bets in a prediction market are indicated, for a risk averse profile. A totally risk averse user would buy the same number of shares of each outcome. In betting terms, the user would place bets on each outcome with equal returns, thus guaranteeing that return no matter which outcome occurs. The interface 2200 includes text 2204 indicating the user's selection of a "Risk averse profile." The highlighted text 2202 indicates the information relates to a prediction market. The interface 2200 is similar to the lower regions 1610 and 1910 of the interfaces 1600 and 1900, respectively, except that the bets under "Your current auto-bets" are automatically proposed by the user interface. For the risk averse profile, the winnings for each outcome are the same, specifically $7,267 in this example. Further, the number of shares which results in the same payout is purchased for each outcome. The number of shares can be determined by the bet amount divided by the bet cost. For instance, 72.67 shares, each paying $100, results in total winnings of $7,267. If the user agrees with the proposed bets, the user selects a button 2212 ("Make bets") to place the bets. Or, the user selects a button 2214 ("Modify bets") to modify the bets. Modifying the automatically proposed bets can be achieved in different ways, e.g., using the slider tool 1814 of FIG. 18, manual entry, or other approach. The user can also change their risk profile to have new bets automatically suggested.

Figure 23:
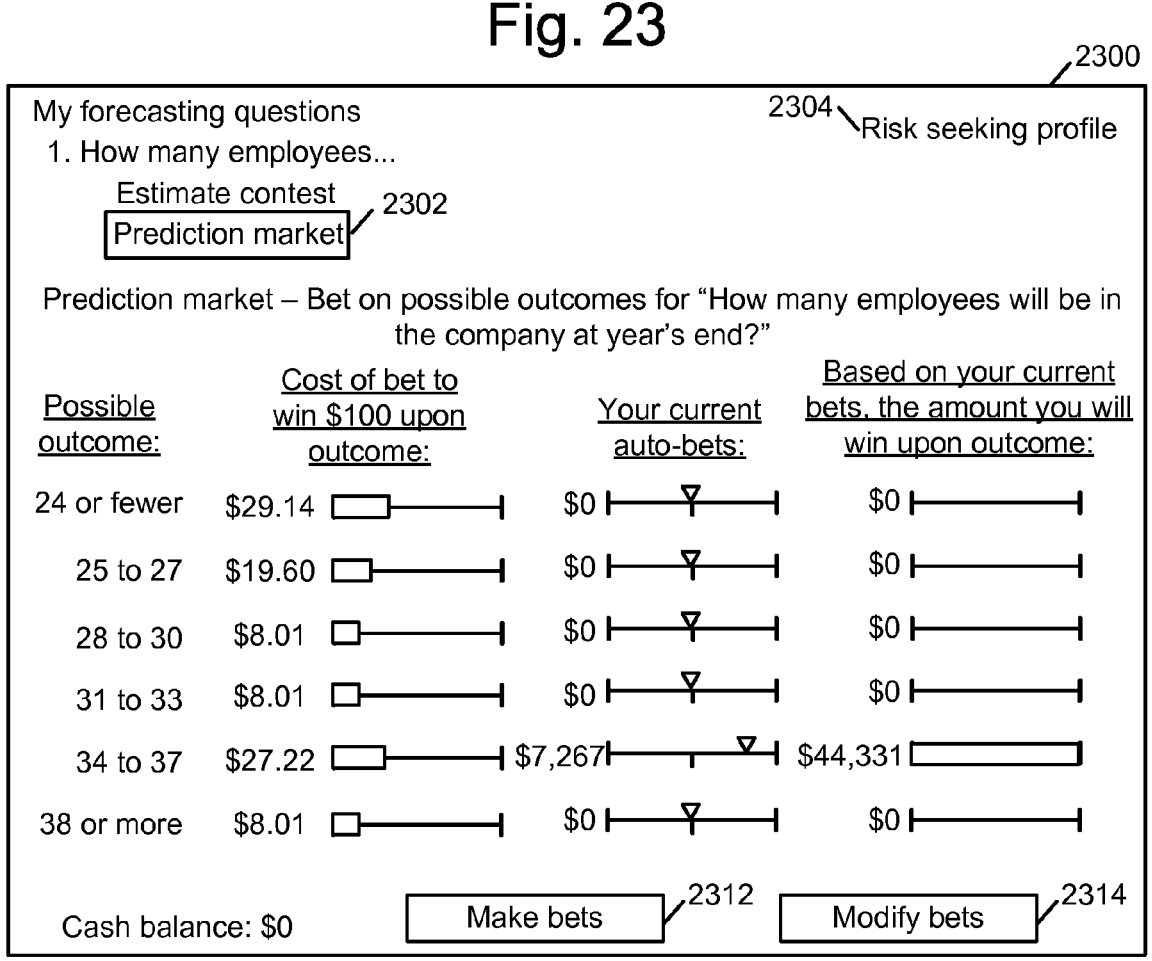
FIG. 23 depicts a user interface in which a user's bets in a prediction market are indicated, for a risk seeking profile.

FIG. 23 depicts a user interface in which a user's bets in a prediction market are indicated, for a risk seeking profile. The interface 2300 includes text 2304 indicating the user's selection of a "Risk seeking profile." The highlighted text 2302 indicates the information relates to a prediction market. The interface 2300 is similar to the lower regions 1610 and 1910 of the interfaces 1600 and 1900, respectively, except that the bets under "Your current auto-bets" are automatically proposed by the user interface. For the risk seeking profile, the user is "all in" on the lowest priced security, which represents the lowest probability of occurrence, because that maximizes risk. In this case, the lowest priced security is for the outcome of 34 to 37 employees. With a bet of $7,267 on this one outcome, the winnings are $44,331 if the outcome is true. With any other outcome, the user's winnings are $0. The risk seeking user thus might bet everything on the lowest priced security in order to maximize the potential winnings, thereby also maximizing the spread between winning and losing, in one possible approach.

The outcome which results in the highest winnings is determined automatically. If the user agrees with the proposed bets, the user selects a button 2312 ("Make bets") to place the bets. Or, the user selects a button 2314 ("Modify bets") to modify the bets, as discussed previously.

For a risk neutral profile, or other profile between the extremes of risk averse and risk seeking, the proposed bets can be based on intermediate positions. For example, a risk profile which is somewhat on the risk averse side can result in proposed bets which are weighted toward achieving similar winnings for different outcomes, and a risk profile which is somewhat on the risk seeking side can result in proposed bets which are weighted toward bets on the lowest priced securities.

A perfectly risk neutral trader, in the center of the risk spectrum, seeks to maximize his expected value. Different approaches can be used for such a risk profile. In a first approach, the user may trade to maximize his expected value in this market alone, e.g., the market at a given time. In this case, the user would find the most under priced security (as a ratio of asking price to perceived value) and then bet everything on that security. In a second approach, the user may trade to maximize his expected value in a sequence of markets, e.g., the market over different times. This approach can involve different strategies. The user does not want to bet all his funds in one market since that may cause the user to go broke before reaching the subsequent markets. Different algorithms can be used to determine how much to bet on each security to maximize the expected value over time.

For the two cases above, there are two interesting inputs: the ratios of prices to user estimates, and a measure of risk aversion (from $-\infty$ to $\infty$, with 0 being neutral). Given those inputs, mathematical techniques can be used to maximize the expected utility of given bets and the system would select bets accordingly. Utility is a measure of value that includes a discount for decreasing/increasing marginal goodness for risk aversion/seeking users.

The analysis is a little more complicated when prices change as shares are bought or sold. Because prices are changing, the relative values of different securities change. Therefore, a risk neutral trader might start buying security X because it is the best deal, but then switch to buying security Y as the price of X gets too high (relative to the estimate) and the price of Y gets more attractive (relative to its estimate). Again, different algorithms can be used to account for such price changes.

Further, as an example of guiding a user's bets based on probabilities expressed by the user, consider the user's estimated probabilities of occurrence in FIG. 16, e.g., 54%, 31%, 15%, 0%, 0% and 0% and the corresponding prediction market probability estimates based on the costs of the bets, e.g., 35%, 17%, 15%, 9%, 11% and 11%, respectively. The prediction market probability estimates are rounded off to two digits in this example. Further, the effects of bet amount on security price are ignored. By identifying the outcome with the largest difference by which the user's estimated probability exceeds the prediction market probability, the system can recommend, e.g., that the risk neutral trader trying to maximize expected value in this market alone should be all in on that outcome since it is the most under priced. That is, the user can place one bet for this outcome. In another approach, the system can recommend that the user place a number of bets, where the bet size is proportional to the discrepancy between the user's probability estimates and the prediction market estimates. Further, a bet for an outcome can be recommended when the user's estimate is greater than the prediction market estimate, and a bet against an outcome can be recommended when the user's estimate is less than the prediction market estimate. Generally, bets can be suggested based on how the current market prices compare to the user's estimates.

The system could also recommend trades based on the probabilities expressed by the user without considering the corresponding prediction market probability estimates or even the risk profile. For example, the system could recommend trades for one or more securities which the user believes are most likely to occur.

By clicking on the button 2212 or 2312 in FIGS. 22 and 23, respectively, for instance, the user is essentially making a "1-click trade." That is, the input by the user triggers a process for completing a trade with no further user input. Based on the user's probability estimates and the current market prices, the system suggests the best bets to make and allows the user to enter a single command to make the bets concurrently. Regarding the amount bet, the user can input an amount or the system can allocate an amount automatically.

In a more complicated scenario, assuming the user is trying to maximize expected value across a sequence of markets, the user might buy both under priced and overpriced securities. Generally, the two extremes of no risk vs. maximum risk can be defined, and by further collecting the user's appetite for risk, or aversion to risk, a variety of methods can be used to provide trading recommendations or automatic trades based on the probability estimates provided as part of the user's participation in the estimate contest.

Figure 24:
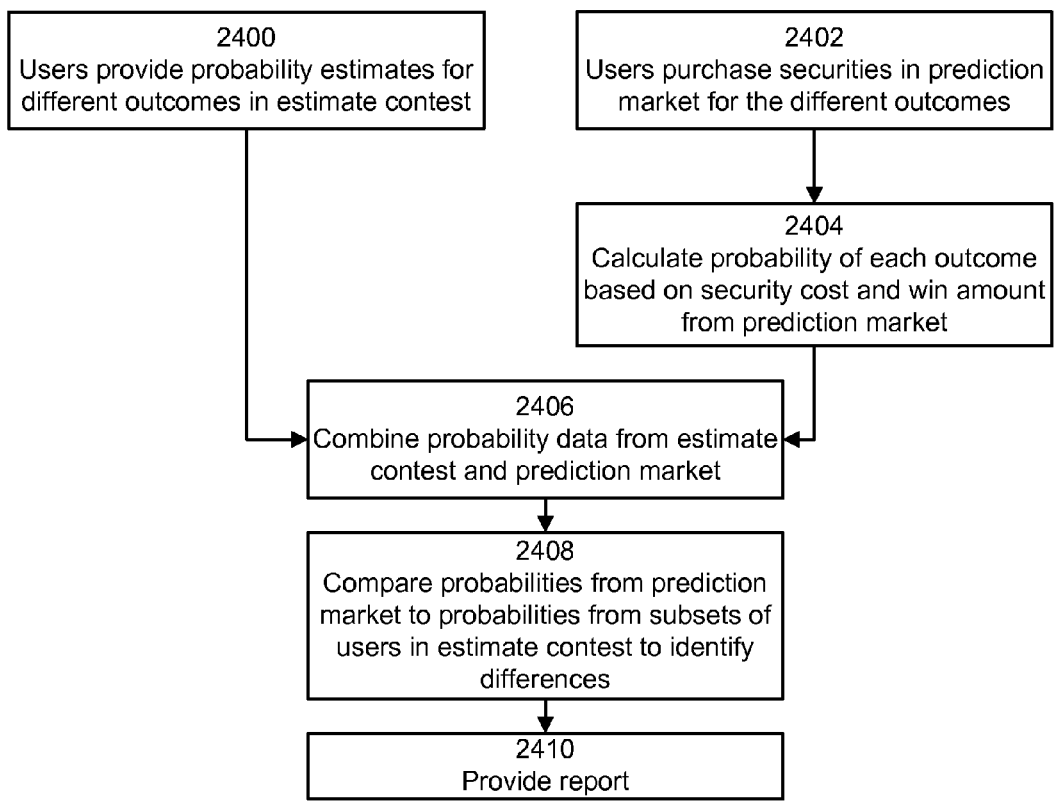
FIG. 24a depicts a process for aggregating data from an estimate contest and a prediction market.
FIG. 24b depicts a user interface which reports aggregated data from an estimate contest and a prediction market.

FIG. 24a depicts a process for aggregating data from an estimate contest and a prediction market. Prediction markets generally produce very accurate information regarding the aggregate opinion of a group but provide little information about individual beliefs or beliefs of a subset of users. On the other hand, estimate contests produce very accurate information about individual beliefs and beliefs of subsets of users, but less accurate aggregations. By combining the two, accurate information can be obtained about the beliefs of an overall group as well as beliefs of individual and subsets of users in a group. In an example process, step 2400 includes users providing probability estimates for different outcomes of an event in an estimate contest. Step 2402 includes user purchasing securities in a prediction market for the different outcomes. The user's participation in the estimate contest and prediction market can occur at the same or different times. Step 2404 includes calculating a probability of each outcome based on the security costs and win amounts from the prediction market. Step 2406 includes combining the probability data from the estimate contest and the prediction market. Step 2408 includes comparing probabilities from the prediction market to probabilities from subsets of users in the estimate contest to identify differences. Step 2410 includes providing a report based on the combining and comparing. See an example report in FIG. 24b.

FIG. 24b depicts a user interface which reports aggregated data from an estimate contest and a prediction market. In an estimate contest, probabilities of occurrence for different outcomes of an event are obtained. Consider a product ship date as an example event which is to be forecasted, where the question is "When will product X ship?" The official ship date set forth by the company is, say, Q1 of 2008. The possible outcomes are "Before Q4 2007," "Q4 of 2007", "Q1 of 2008" and "After Q1 of 2008," where "Q" represents a quarter or three month period of the year. The estimate contest involves employees of the company, in an example approach. In the estimate contest, the estimates provided by different subsets of users or individual users can be identified. For example, one subset can include managers, one subset can include engineers and another subset can include designers. In this approach, each user has an associated profile which identifies his or her job position in the company. Using data from the estimate contest, we can answer a question such as "How likely is it that managers think the product will ship in Q1 of 2008," "How likely is it that engineers think the product will ship in Q1 of 2008" and "How likely is it that designers think the product will ship in Q1 of 2008." An average probability for each subset can be obtained by averaging the estimates of each user in the subset. Also, estimates of individual users can be weighted based on data regarding the previous prediction skills of the users, if available.

In a prediction market, market equilibrium prices represent the group's opinion about the likelihood of each outcome. This produces the most accurate aggregate answer possible. In this example, perhaps a security which represents the outcome of "Q4 2007" is trading at $40 for a payoff of $100. This means that the group as a whole thinks that a product ship date of Q4 2007 has a 40% probability. However, this provides no information about the beliefs of subsets of users or individual users. It is possible to analyze trades which are made by subsets of users or individual users in the prediction market, but this only indicates that they liked particular trades, and does not necessarily indicate what their opinion is. For instance, a particular user may have purchased shares of a security which represents the outcome of a Q1 2008 ship date, where the purchase pushes the share price up to $20 (for a $100 payoff). This tells us that the particular employee believes that outcome has at least a 20% probability of occurring, but nothing else. The aggregate probability information obtained from a prediction market is more accurate than in an estimate contest, because users are able to adjust their trades for risk. So, if the particular user has some inside information and knows that the Q1 2008 date is very likely, he can place a bet "all-in" for that outcome. Prediction markets also incorporate more competition and can be more entertaining than estimate contests, so it can be easier to get a group of users engaged. By combining estimate contests and prediction markets, we obtain the best features of each. Additionally, as discussed, we can use results from the estimate contest to help suggest trades and otherwise make it easier for users to participate in the prediction market.

In the example user interface report 2420, the possible outcomes are listed along with the probabilities from the prediction market and from the estimate contest to provide a comparison. The estimate contest results are provided for first and second user subsets and an for an individual user. For the outcome "Before Q4 2007", the prediction market probability is 25%, the first user subset probability (e.g., for managers) is 35%, the second user subset probability (e.g., for engineers) is 15%, and a particular user C probability (e.g., for a particular "expert" user who has demonstrated accurate estimates in the past) is 20%. For the outcome "Q4 2007", the probabilities are 40%, 45%, 25% and 30%, respectively. For the outcome "Q1 2008", the probabilities are 20%, 10%, 40% and 45%, respectively. For the outcome "After Q1 2008", the probabilities are 15%, 10%, 20% and 5%, respectively. The prediction market probabilities of 25%, 40%, 20% and 15% are based on security costs of $25, $40, $20 and $15, respectively, and a payoff of $100.

From the prediction market probabilities, we can see that the group of users as a whole believes a Q4 2007 ship date is most likely. Then we can turn to the estimate contest data to help us understand why. Here, the report indicates that the user subset A (managers) believes a Q4 2007 ship date is most likely, and that a before Q4 2007 ship date is also fairly likely. The report also indicates that the user subset B (engineers) believes a Q1 2008 ship date is most likely, and that the earlier ship dates are fairly unlikely. The report also indicates that the particular user C also believes a Q1 2008 ship date is most likely, and that the earlier ship dates are fairly unlikely. From this, it can be concluded that the engineers and managers have different opinions on the ship date, and that the expert user C, who has provided accurate estimates in the past, is in general agreement with the engineers as to the ship date. In particular, the managers' opinions are more optimistic that the product will ship sooner. The company might use this data to suggest that the managers communicate more with the engineers to determine why they believe the product will ship later and to provide corresponding corrective actions.

A button 2430 allows the report to be modified, such as to compare the probability estimates of different subsets of users or individual users with the prediction market data and with one another. For example, a display can be provided in which check boxes allow different subsets of users or individual users to be selected for comparison. Additionally, results from multiple estimate contests and prediction markets can be accessed and compared.

In other examples, aggregated data from an estimate contest and a prediction market could be used to aggregate opinions of Democrats vs. Republicans, or men vs. women, etc.

Figure 25:
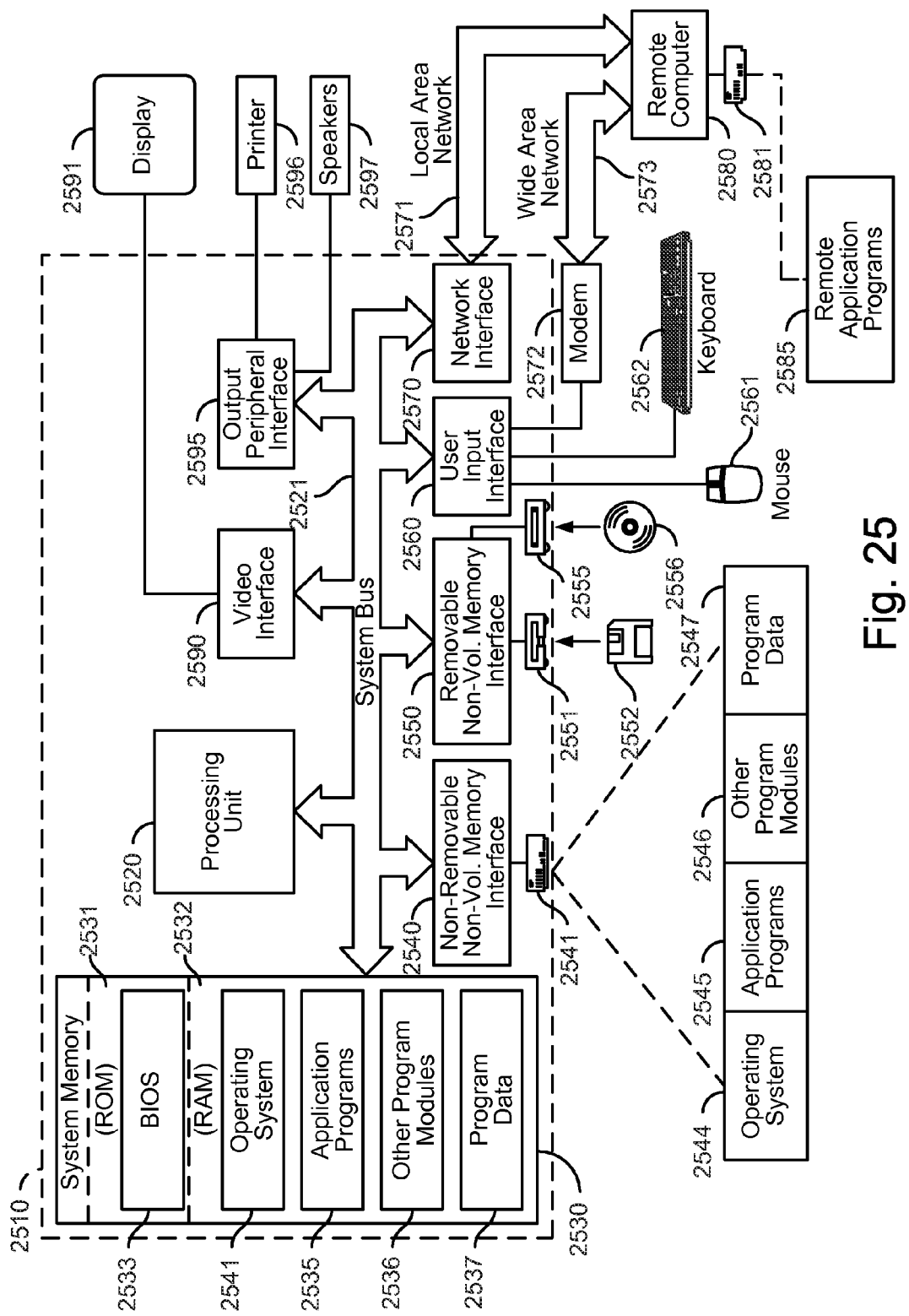
FIG. 25 is a block diagram of computer hardware suitable for implementing embodiments of the invention.

FIG. 25 is a block diagram of computer hardware suitable for implementing embodiments of the invention. An exemplary system for implementing the invention includes a general purpose computing device in the form of a computer 2510. The computer 2510 may represent a server which provides a user interface, estimate contest, prediction market, and/or scoring rules, for instance. Components of computer 2510 may include, but are not limited to, a processing unit 2520, a system memory 2530, and a system bus 2521 that couples various system components including the system memory to the processing unit 2520. The system bus 2521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 2510 typically includes a variety of computer readable media. Computer readable media can be any available media that can be accessed by computer 2510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 2510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 2530 includes computer storage media in the form of volatile and/or nonvolatile memory such as read only memory (ROM) 2531 and random access memory (RAM) 2532. A basic input/output system 2533 (BIOS), containing the basic routines that help to transfer information between elements within computer 2510, such as during start-up, is typically stored in ROM 2531. RAM 2532 typically contains data and/or program modules that are immediately accessible to and/or presently being operated on by processing unit 2520. By way of example, and not limitation, FIG. 25 illustrates operating system 2534, application programs 2535, other program modules 2536, and program data 2537.

The computer 2510 may also include other removable/non-removable, volatile/nonvolatile computer storage media. By way of example only, FIG. 25 illustrates a hard disk drive 2541 that reads from or writes to non-removable, nonvolatile magnetic media, a magnetic disk drive 2551 that reads from or writes to a removable, nonvolatile magnetic disk 2552, and an optical disk drive 2555 that reads from or writes to a removable, nonvolatile optical disk 2556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2541 is typically connected to the system bus 2521 through a non-removable memory interface such as interface 2540, and magnetic disk drive 2551 and optical disk drive 2555 are typically connected to the system bus 2521 by a removable memory interface, such as interface 2550.

The drives and their associated computer storage media discussed above and illustrated in FIG. 25, provide storage of computer readable instructions, data structures, program modules and other data for the computer 2510. For example, hard disk drive 2541 is illustrated as storing operating system 2544, application programs 2545, other program modules 2546, and program data 2547. These components can either be the same as or different from operating system 2534, application programs 2535, other program modules 2536, and program data 2537. Operating system 2544, application programs 2545, other program modules 2546, and program data 2547 are given different numbers here to illustrate that, at a minimum, they are different copies. A user may enter commands and information into the computer 2510 through input devices such as a keyboard 2562 and pointing device 2561, commonly referred to as a mouse, trackball or touch pad. Other input devices (not shown) may include a microphone, joystick, game pad, satellite dish, scanner, or the like. These and other input devices are often connected to the processing unit 2520 through a user input interface 2560 that is coupled to the system bus, but may be connected by other interface and bus structures, such as a parallel port, game port or a universal serial bus (USB). A monitor 2591 or other type of display device is also connected to the system bus 2521 via an interface, such as a video interface 2590. In addition to the monitor, computers may also include other peripheral output devices such as speakers 2597 and printer 2596, which may be connected through an output peripheral interface 2595.

The computer 2510 may operate in a networked environment using logical connections to one or more remote computers, such as a remote computer 2580. The remote computer 2580 may be a personal computer, a server, a router, a network PC, a peer device or other common network node, and typically includes many or all of the elements described above relative to the computer 2510, although only a memory storage device 2581 has been illustrated. The logical connections depicted include a local area network (LAN) 2571 and a wide area network (WAN) 2573, but may also include other networks. Such networking environments are commonplace in offices, enterprise-wide computer networks, intranets and the Internet.

When used in a LAN networking environment, the computer 2510 is connected to the LAN 2571 through a network interface or adapter 2570. When used in a WAN networking environment, the computer 2510 typically includes a modem 2572 or other means for establishing communications over the WAN 2573, such as the Internet. The modem 2572, which may be internal or external, may be connected to the system bus 2521 via the user input interface 2560, or other appropriate mechanism. In a networked environment, program modules depicted relative to the computer 2510, or portions thereof, may be stored in the remote memory storage device. By way of example, and not limitation, FIG. 25 illustrates remote application programs 2585 as residing on memory device 2581. It will be appreciated that the network connections shown are exemplary and other means of establishing a communications link between the computers may be used.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer-implemented method for forecasting a future event, comprising:

providing a user interface which identifies parameters of a prediction market, the parameters include a question regarding the future event and a set of different outcomes of the future event, each outcome is represented by a respective security in the prediction market, the parameters are defined by a sponsor of the prediction market, and the user interface concurrently displays the set of different outcomes of the future event;

receiving an input from a user, via the user interface, of an estimated probability of occurrence of each of the different outcomes of the future event;

concurrently displaying, via the user interface, and in response to the input from the user, the different outcomes of the future event, and the user's estimated probability of occurrence of each of the different outcomes of the future event;

for each of the different outcomes of the future event, automatically determining: (a) a proposed bet, an amount of the proposed bet is based on the user's estimated probability of occurrence of the outcome of the future event, and (b) a win amount based on the proposed bet;

concurrently displaying, via the user interface, for each of the different outcomes of the future event: the outcome of the future event, the proposed bet and the win amount;

receiving a user command, via the user interface, for accepting at least one of the proposed bets; and in response to the command, executing at least one trade in the prediction market for shares of at least one respective security which represents the at least one of the proposed bets, a number of the shares is based on the amount of the at least one of the proposed bets.

2. The computer-implemented method of claim 1, wherein:

for each of the different outcomes of the future event: the automatically determining a proposed bet comprises determining a difference between: (c) a probability of occurrence from the prediction market based on a price of one of the respective securities, and (d) the user's estimated probability of occurrence.

3. The computer-implemented method of claim 1, further comprising:

for each of the different outcomes of the future event:

accepting the proposed bet results in a trade to buy one of the securities which represents one of the outcomes for which the user's estimated probability exceeds the prediction market's probability.

4. The computer-implemented method of claim 1, further comprising:

for each of the different outcomes of the future event:

accepting the proposed bet results in a trade to buy one of the securities which represents one of the outcomes for which the user's estimated probability is highest among the user's estimated probabilities.

5. The computer-implemented method of claim 1, further comprising:

receiving an input from the user, via the user interface, indicating a risk profile of the user, wherein the proposed bets determined based on the risk profile;

receiving an input from the user, via the user interface, to change the risk profile of the user; and in response to the changed risk profile, automatically suggesting new bets to the user, via the user interface, for the different outcomes of the future event.

6. The computer-implemented method of claim 5, wherein: the risk profile is risk averse and the proposed bets includes bets for each of the different outcomes which yield an equal win amount.

7. The computer-implemented method of claim 5, wherein: the risk profile is risk seeking and the proposed bets favor riskier trades.

8. The computer-implemented method of claim 1, further comprising:

receiving a user command, via the user interface, for accepting each of the proposed bets and, in response, executing a trade in the prediction market for shares of each security, a number of the shares of each security is based on the amounts of the proposed bets.

9. A computer-implemented method for forecasting a future event, comprising:

obtaining estimated probabilities of occurrence of different outcomes of the future event from different subsets of users in an estimate contest, each outcome is represented by a respective security in a prediction market;

obtaining probabilities of occurrence of the different outcomes of the future event based on prices of the securities, each security price represents a probability based on a ratio of cost to payoff; and providing a report via a user interface based on the estimated probabilities of occurrence from the estimate contest and the probabilities of occurrence from the prediction market, the report identifies the different outcomes of the future event, and, for each of the different outcomes of the future event, identifies the estimated probabilities of occurrence from the estimate contest, for each of the different subsets of users, and the probability of occurrence of the prediction market.

10. The computer-implemented method of claim 9, wherein:
the report provides a comparison of the estimated probabilities of occurrence from the estimate contest for at least one of the users in the estimate contest to the probabilities of occurrence from the prediction market.

11. Computer readable media having computer readable software embodied thereon for programming at least one processor to perform a method, the method comprising:
providing a user interface which identifies parameters of a prediction market, the parameters include a question regarding the future event and a set of different outcomes of the future event, each outcome is represented by a respective security in the prediction market, the user interface displays the set of different outcomes of the future event, and the parameters are defined by a sponsor of the prediction market;
receiving a user input, via a user interface, regarding of an estimated probability of occurrence of each of the different outcomes of the future event, and regarding a risk level of the user;
for each of the different outcomes of the future event, automatically determining a proposed bet based on the user's estimated probabilities and risk level
concurrently displaying, via the user interface, for each of the different outcomes of the future event: the outcome of the future event, a cost of the proposed bet, the proposed bet, and a win amount based on the proposed bet;
receiving a user command, via the user interface, for accepting at least one of the proposed bets; and
in response to the user command, executing at least one trade in the prediction market for shares of at least one respective security which represents the at least one of the proposed bets, a number of the shares is based on an amount of the at least one of the proposed bets.

12. The computer readable media of claim 11, wherein the method performed further includes:
determining, from the prediction market, probabilities of occurrence of the different outcomes of the future event; and
identifying differences between the user's estimated probabilities and the prediction market's probabilities, the proposed bets are determined based on the differences.

13. The computer readable media of claim 12, wherein:
the probabilities of occurrence determined from the prediction market are determined, for each of the different outcomes of the future event, based on the cost of the proposed bet and the win amount of the proposed bet in the prediction market.

14. The computer readable media of claim 11, wherein:
the proposed bets are designed to maximize an expected value for the user in the prediction market at a given time.

15. The computer readable media of claim 11, wherein:
the proposed bets are designed to maximize an expected value for the user in the prediction market over different times.

16. The computer-implemented method of claim 1, wherein:
the at least one trade includes a trade to sell one of the securities which represents one of the outcomes for which the user's estimated probability is less than the prediction market's probability.

17. The computer-implemented method of claim 1, further comprising:
receiving a selection from the user via the user interface which modifies at least one of the proposed bets using at least one of a slider tool and a manual entry.

18. The computer-implemented method of claim 1, wherein:
for each of the different outcomes of the future event: a cost of a bet is concurrently displayed with the outcome of the future event, the proposed trade, and the win amount.

19. The computer-implemented method of claim 1, wherein:
at least one of the estimated probabilities of occurrence is more than 0% and less than 100%.

20. The computer-implemented method of claim 9, further comprising:
to provide the estimated probabilities of occurrence, weighting an estimate of an individual user based on data regarding previous prediction skills of the individual.

* * * * *